United States Patent [19]

Katto

[11] Patent Number: 5,917,936
[45] Date of Patent: Jun. 29, 1999

[54] OBJECT DETECTING SYSTEM BASED ON MULTIPLE-EYE IMAGES

[75] Inventor: Jiro Katto, Tokyo, Japan

[73] Assignee: NEC Corporation, Tokyo, Japan

[21] Appl. No.: 08/800,402

[22] Filed: Feb. 14, 1997

[30] Foreign Application Priority Data

Feb. 14, 1996 [JP] Japan .................................... 8-026349

[51] Int. Cl.⁶ .................................................. G06K 9/00
[52] U.S. Cl. ........................... 382/154; 382/225; 382/283
[58] Field of Search .................................... 382/291, 225, 382/154, 254, 263, 282, 283, 149, 228

[56] References Cited

U.S. PATENT DOCUMENTS

| | | | |
|---|---|---|---|
| 5,309,522 | 5/1994 | Dye ......................................... | 382/154 |
| 5,359,671 | 10/1994 | Rao ......................................... | 348/169 |
| 5,513,275 | 4/1996 | Khalaj et al. ........................... | 382/149 |
| 5,534,917 | 7/1996 | Macdougall ............................ | 348/169 |
| 5,768,415 | 6/1998 | Jagadish et al. ........................ | 382/154 |

OTHER PUBLICATIONS

Kawai Y. et al., "Reconstruction of 3D Objects by Integration of Multiple Range Data", Pattern Recognition, 1992 11th Int'l, vol. I: Conference A.

Dhond et al., "Structure From Stero—A Review", IEEE Transactions on Systems, Man, and Cybernetics, vol. 19, No. 6, (1989), pp. 1489–1511.

Pentland, "ANew Sense of Depth of Field", IEEE Transactions on Pattern Analysis and Machine Intelligence, vol. Pami–9, No. 4, (1987) pp. 523–531.

Izumi et al., "Combining Color and Spatial Information for Segmentation", The University of Tokyo, D–680.

Katto et al., "Focusing—Three–Dimensional Picture Coding with Focusing", Information Technology Research Laboratories, NEC Corp., (1995), pp. 65–66.

Yokoyama et al., "Image Segmentation for Video Coding Using Motion Information", Information Technology Research Laboratories, NEC Corp., (1994), p. 156.

Primary Examiner—Joseph Mancuso
Assistant Examiner—Martin E. Miller
Attorney, Agent, or Firm—Foley & Lardner

[57] ABSTRACT

An object detecting system based on multiple-eye images, comprises an image sharpening unit receiving a plurality of images having substantially the same optical axis and different focus positions, for generating one sharpened image, a focus information and a cluster information, a mask generating unit receiving the focus information for generating a first objection detecting information, a region integrating unit receiving the cluster information for generating an integrated cluster information, a region selecting unit receiving the first objection detecting information and the integrated cluster information for generating a second objection detecting information, and an object extracting unit receiving the sharpened image and the second objection detecting information for extracting an object image from the sharpened image in accordance with the second objection detecting information.

8 Claims, 16 Drawing Sheets

OBJECT DETECTING SYSTEM BASED ON MULTIPLE-EYE IMAGES

BACKGROUND OF THE INVENTION

1. Field of the Invention

The present invention relates to an object detecting system based on multiple-eye images.

2. Description of Related Art

A technology for extracting only a target object from an image signal (called a "segmentation") is now being researched for application to an image interpretation, an image edition in units of an extracted object, and an image data base.

A first clue for this purpose is a so called image region segmentation scheme. Particularly, a scheme exploiting a clustering technique not only gives a good region segmentation result, but also is resistant to noises. For example, reference can be made to a five-dimensional clustering technique proposed by N. Izumi, H, Morikawa and H. Harashima, "Combining Color and Spatial Information for Segmentation", 1991 Spring Meeting of Japan Society of Electronics, Information and Communication, D-680 (1991). This proposed clustering technique takes into account the five-dimensional space including the tristimulus values R, G and B as a feature amount space and a pixel position (x, y). Here, assume that a color information of an attentive pixel is (R, G, B), a position information of the attentive pixel is (x, y), a mean value of a color information of the cluster at an index "n" is $(\bar{R}n, \bar{G}n, \bar{B}n)$, and a positional gravity of the cluster at the index "n" is $\bar{x}n, \bar{y}n)$. Under this assumption, a distance "$d_n$" between the attentive pixel and the "n"th cluster is defined as follows:

$$d_n{}^2 = w_0{}^*[(R-\bar{R}n)^2 + (G-\bar{G}n)^2 + (B-\bar{B}n)^2] + w_1{}^*[(x-\bar{x}n)^2 + (y-\bar{y}n)^2] \quad (1)$$

where $w_0$ and $w_1$ are weighting coefficients, respectively.

Furthermore, the distance $d_n$ is calculated for a plurality of clusters in the neighborhood of the attentive pixel, and it is concluded that the attentive pixel belongs to the cluster "n" having a minimum distance $d_n$. It is reported that, with this arrangement, it is possible to realize the region segmentation of the image signals without losing a local information and with a high resistance to noises. An object detection can be realized by collecting statistically similar clusters to generate an integrated cluster. However, this approach cannot avoid a considerable amount of erroneous detection because color information of only one image is used.

Furthermore, Y. Yokoyama and Y. Miyamoto, "Image segmentation for video coding using motion information", 1994 Autumn Meeting of Japan Society of Electronics, Information and Communication, D-150 (1994), reports an extension of the above mentioned clustering algorithm to a moving picture. According to this report, a seven-dimensional feature amount space including three luminance and color difference signals Y, Cr and Cb, a pixel position (x, y) arid a two-dimensional displacement vector is considered. Here, if is assumed that the displacement vector derived for each pixel is $(v_x, v_y)$, and the displacement vector derived for each cluster "n" is $(v_{n,x}, v_{n,y})$, a distance $d_n$ between the attentive pixel and the "n"th cluster is defined as follows:

$$d_n^2 = w_0 \cdot \left[(Y - \overline{Y_n})^2 + (Cr - \overline{Cr_n})^2 + (Cb - \overline{Cb_n})^2\right] + \quad (2)$$
$$w_1 \cdot [(x - \overline{x_n})^2 + (y - \overline{y_n})^2] + w_2 \cdot [(v_x - v_{n,x})^2 + (v - v_{n,y})^2]$$

where $w_0$, $w_1$ and $w_2$ are weighting coefficients, respectively.

Furthermore, the distance $d_n$ is calculated for a plurality of clusters in the neighborhood of the attentive pixel, and it is concluded that the attentive pixel belongs to the cluster "n" having a minimum distance $d_n$. In this second proposal, the RGB space of the first proposal is changed to the YCrCb space, but this change does not have a substantial influence to the result of the region segmentation. It is reported that, with this arrangement, an encoding efficiency in the motion compensation prediction is improved in comparison with the clustering of the first proposal which does not use the displacement vector information. In addition, similar to the first proposal, the object detection can be realized by collecting statistically similar clusters to generate an integrated cluster. However, this second approach cannot also avoid a considerable amount of erroneous detection because the region segmentation does not become stable for variation in the motion information used.

A second clue for the object detection is a structure restoration scheme using focal information. For example, reference can be made to A. P. Pentland: "A New Sense for Depth of Field", IEEE Transactions on Pattern Analysis and Machine Intelligence, Vol. PAMI-9, No.4, pp523–531 (July 1987), the disclosure of which is incorporated in its entirety into this application. This second approach proposes to conduct an edge detection, to seek a brightness gradient in the neighborhood of the edge, and to obtain the depth of the object on the basis of the degree of the brightness gradient. However, this second approach still cannot solve the problem of erroneous detection, because (1) a satisfactory precision cannot be obtained concerning the degree of blurring in the neighborhood of the edge, (2) the depth cannot be sought in portions other than the edge, and (3) the detected edge does not necessarily constitute a closed region.

A third clue for the object detection is a structure restoration scheme using a stereo image. For example, reference can be made to U. R. Dhond and J. K. Aggarwal: "Structure from Stereo—A Review", IEEE Transactions on Systems, Man and Cybernetics. Vol 19, No. 6, pp1489–1510 (Nov./Dec., 1989), the disclosure of which is incorporated in its entirety into this application. This paper explains how to obtain the disparity information from images in stereo, by using a relaxation and a dynamic programming. In the third approach, however, since the disparity detection involves errors, the problem of erroneous detection still cannot be solved.

As another topic concerning the use of the focal information, Japanese Patent Application No. Heisei-7-249961 entitled "Three-Dimensional Image Coding System" and its corresponding U.S. patent application Ser. No. 08/720,378 filed on Sep. 27, 1996 now U.S. Pat. No. 5,696,551, the disclosure of which is incorporated in its entirety into this application, proposes a system of obtaining a sharpened image from a plurality of image having different focus positions, by utilizing the clustering technique. By using this system, it is possible to get a clue for the object detection, such as to which of focal images each pixel belongs, and at what degree of depth each pixel is positioned.

As still another topic concerning the use of the focal information, J. Katto and M. Ohta: "Three-Dimensional Picture Coding with Focusing", 1995 Image Coding Symposium (PCSJ95), Oct. 2, 1995, pp65–66, the disclosure of which is incorporated in its entirety into this application, and which will be referred to as "Literature 1" hereinafter, proposes a system of obtaining disparity information, by utilizing the clustering technique. By using this system, it is possible to get a clue for the object detection, such as to which of disparity ranges each pixel belongs, and at what degree of depth each pixel is positioned.

However, the existing object detecting systems based on image signals cannot sufficiently reduce tie erroneous detection.

SUMMARY OF THE INVENTION

Accordingly, it is an object of the present invention to provide an object detecting system which has overcome the above mentioned defects of the conventional systems.

Another object of the present invention is to provide an object detecting system based on the region segmentation scheme utilizing the clustering techniques and capable of realizing the object detection from image signals, with minimized erroneous detection, by using a plurality of differently focused images and/or a plurality of images having different disparities.

The above and other objects of the present invention are achieved in accordance with the present invention by an object detecting system based on multiple-eye images, comprising an image sharpening means receiving a plurality of images having substantially the same optical axis and different focus positions, for generating one sharpened image, a focus information and a cluster information, a mask generating means receiving the focus information for generating a first objection detecting information, a region integrating means receiving the cluster information for generating an integrated cluster information, a region selecting means receiving the first objection detecting information and the integrated cluster information for generating a second objection detecting information, and an object extracting means receiving the sharpened image and the second objection detecting information for extracting an object image from the sharpened image in accordance with the second objection detecting information.

According to another aspect of the present invention, there is provided an object detecting system based on multiple-eye images, comprising a disparity detecting means receiving a plurality of images having different optical axes, for generating one reference image, a disparity information and a cluster information, a mask generating means receiving the disparity information for generating a first objection detecting information, a region integrating means receiving the cluster information for generating an integrated cluster information, a region selecting means receiving the first objection detecting information and the integrated cluster information for generating a second objection detecting information, and an object extracting means receiving the reference image and the second objection detecting information for extracting an object image from the reference image in accordance with the second objection detecting information.

According to still another aspect of the present invention, there is provided an object detecting system based on multiple-eye images, comprising a first image sharpening means receiving a plurality of images having substantially the same first optical axis and different focus positions, for generating a first sharpened image, a focus information and a cluster information, a second image sharpening means receiving a plurality of images having substantially the same second optical axis different from the first optical axis and different focus positions, for generating a second sharpened image, a disparity detecting means receiving the first sharpened image and the second sharpened image having different optical axes, for generating a disparity information, a mask generating means receiving the focus information and the disparity information for generating a first objection detecting information, a region integrating means receiving the cluster information for generating an integrated cluster information, a region selecting means receiving the first objection detecting information and the integrated cluster information for generating a second objection detecting information, and an object extracting means receiving the first sharpened image and the second objection detecting information for extracting an object image from the first sharpened image in accordance with the second objection detecting information.

According to a further aspect of the present invention, there is provided: an object detecting system based on multiple-eye images, comprising a first image sharpening means receiving a plurality of images having substantially the same first optical axis and different focus positions for generating a first sharpened image and a focus information, a second image sharpening means receiving a plurality of images having substantially the same second optical axis different from the first optical axis and different focus positions, for generating a second sharpened image, a disparity detecting means receiving the first sharpened image and the second sharpened image having different optical axes, for generating a disparity information and a cluster information, a mask generating means receiving the focus information and the disparity information for generating a first objection detecting information, a region integrating means receiving the cluster information for generating an integrated cluster information, a region selecting means receiving the first objection detecting information and the integrated cluster information for generating a second objection detecting information, and an object extracting means receiving the first sharpened image and the second objection detecting information for extracting an object image from the first sharpened image in accordance with the second objection detecting information.

The above and other objects, features and advantages of the present invention will be apparent from the following description of preferred embodiments of the invention with reference to the accompanying drawings.

DESCRIPTION OF THE PREFERRED EMBODIMENTS

Figure 1:
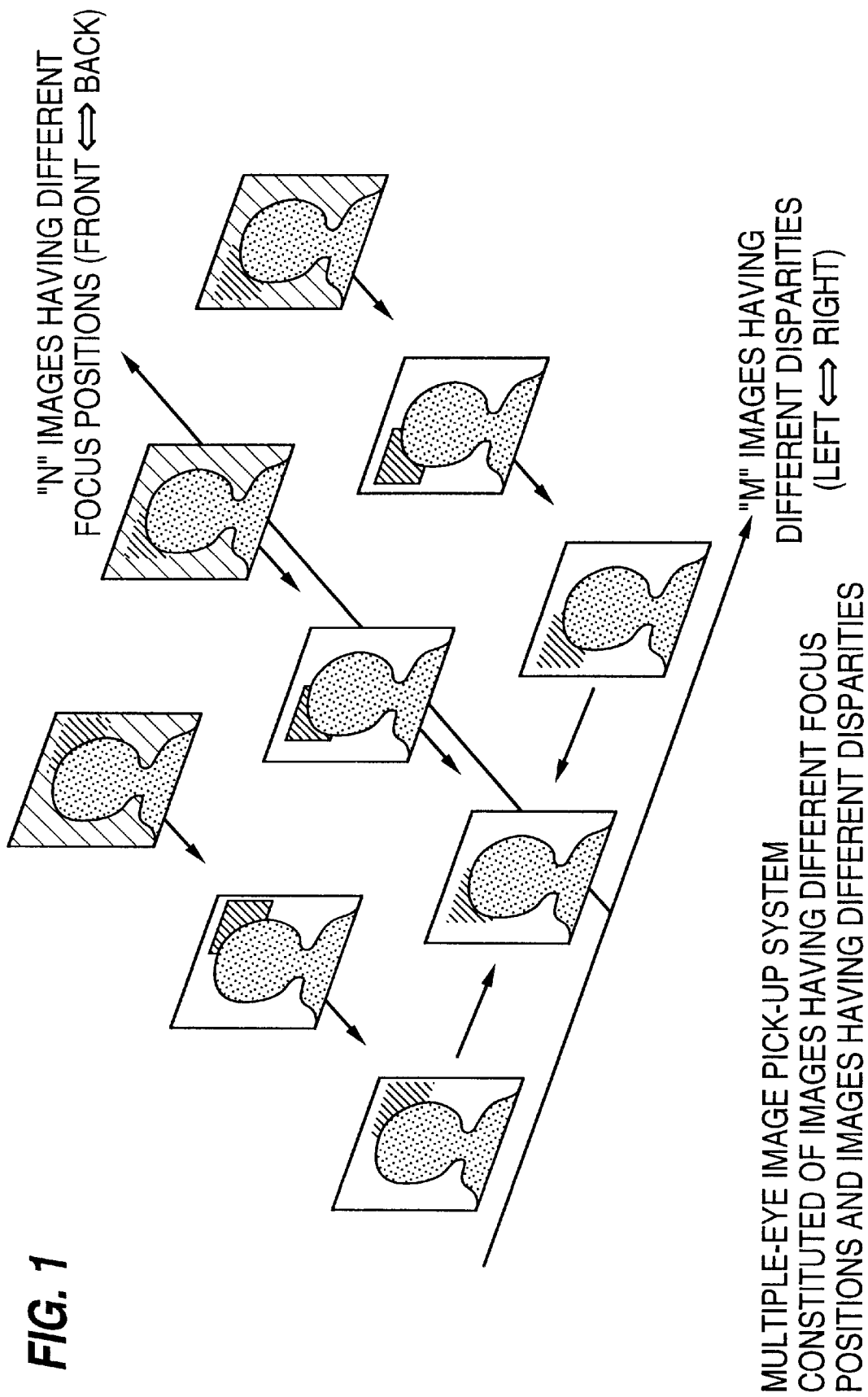
FIG. 1 diagrammatically illustrates a plurality of images having different focus positions and a plurality of images having different disparities, which are processed by the object detection system in accordance with the present invention.

In the object detection system in accordance with the present invention, a plurality of images having different focus positions and a plurality of images having different disparities, as diagrammatically illustrated in FIG. 1, are first photographed. As regards a direction of a focal depth, a plurality of images are obtained by photographing by use of one camera while changing the focus position, image by image. Alternatively, if a time difference is not permitted, a plurality of images are obtained by using a plurality of cameras set to have different focus positions but the same optical axis aligned by using a half mirror, a prism and/or other means. As regards a direction of disparity, a plurality of images are obtained by photographing by use of one camera while displacing the camera in a horizontal direction, image by image. Alternatively, if a time difference is not permitted, a plurality of images are obtained by using a plurality of cameras located at different positions in the horizontal direction.

First, the object detection can be realized as follows, from a plurality of image signals, and by using the scheme, disclosed in the "Literature 1" referred to hereinbefore, for sharpening a plurality of images having different focus positions. In brief, only a plurality of images having different focus positions are considered, and an image sharpening processing is conducted to these images. Then, on the basis of the obtained focusing discrimination information, a map is prepared by allocating "1" when the pixel is included in the attentive focused image and "0" when the pixel is not included in the attentive focused image. A rough object extraction is performed by obtaining a logical AND between the obtained sharpened image and the obtained map. On the basis of the clustering result obtained concerning the attentive focused image, a large integrated cluster is constituted by collecting clusters having a statistically similar feature. Furthermore, for each of the obtained integrated clusters, the number of pixels included in the result of the above mentioned rough object extraction are counted, and a ratio of the counted number to the number of all pixels included in the integrated cluster is calculated. The integrated cluster having the obtained ratio larger than a predetermined value is selected. A set of the selected integrated clusters are considered as a final result of the object extraction.

The result of the rough object extraction by itself often includes an erroneous detection region attributable to the sharpening. However, by combining the result of the rough object extraction and the result of the integration of clustering, the erroneous detection can be greatly reduced.

On the other hand, the object detection can be realized as follows, from a plurality of image signals, and by using the disparity detecting scheme, disclosed in the "Literature 1" referred to hereinbefore, from a plurality of images having different disparities. In brief, only a plurality of images having different disparities are considered, and a disparity detecting is conducted to these images. Then, on the basis of the obtained disparity discrimination information, a map is prepared by allocating "1" when the pixel is included in the attentive disparity range and "0" when the pixel is not included in the attentive disparity range. A rough object extraction is performed by obtaining a logical AND between the input image and the obtained map. On the basis of the clustering result obtained concerning the attentive disparity image, a large integrated cluster is constituted by collecting clusters having a statistically similar feature. Furthermore, for each of the obtained integrated clusters, the number of pixels included in the result of the above mentioned rough object extraction are counted, and a ratio of the counted number to the number of all pixels included in the integrated cluster is calculated. The integrated cluster having the obtained ratio larger than a predetermined value is selected. A set of the selected integrated clusters are considered as a final result of the object extraction.

The result of the rough object extraction by itself often includes an erroneous detection region attributable to the disparity detection. However, by combining the result of the rough object extraction and the result of the integration of clustering, the erroneous detection can be greatly reduced.

Furthermore, the object detection can be realized as follows, from a plurality of image signals, and by using, in combination, the scheme for sharpening a plurality of images having different focus positions, and the disparity detecting scheme from a plurality of images having different disparities, both disclosed in the "Literature 1" referred to hereinbefore.

First, an image sharpening processing is conducted for a plurality of images having different focus positions, so that a plurality of sharpened images having different disparities are obtained. Then, a disparity detecting is conducted for the thus obtained plurality of sharpened images having different disparities. On the basis of the obtained focus information and the obtained disparity information, a first map is prepared by allocating "1" when the pixel is included in the attentive focused image and "0" when the pixel is not included in the attentive focused image, and a second map is prepared by allocating "1" when the pixel is included in the attentive disparity range and "0" when the pixel is not included in the attentive disparity range. Then, a rough object extraction is performed by obtaining a logical AND between the first map, the second map and an input image.

Furthermore, on the basis of the clustering result obtained concerning the attentive focused image, a large integrated cluster is constituted by collecting clusters having a statistically similar feature. Then, for each of the obtained integrated clusters, the number of pixels included in the result of the above mentioned rough object extraction ale counted, and a ratio of the counted number to the number of all pixels included in the integrated cluster is calculated. The integrated cluster having the obtained ratio larger than a predetermined value is selected. A set of the selected integrated clusters are considered as a final result of the object extraction.

The result of the rough object extraction by itself often includes an erroneous detection region attributable to the sharpening and to the disparity detection. However, by combining the result of the rough object extraction and the result of the integration of clustering of the sharpened image, the erroneous detection can be greatly reduced.

Alternatively, the object detection can be realized as follows, from a plurality of image signals, and by using, at the time of generating the integrated cluster, the result of the clustering at the disparity detecting time, in place of the result of the clustering at the image sharpening time.

For this purpose, an image sharpening processing is conducted for a plurality of images having different focus positions, so that a plurality of sharpened images having different disparities are obtained. Then, a disparity detecting is conducted for the thus obtained plurality of sharpened images having different disparities. On the basis of the obtained focus information and the obtained disparity information, a first map is prepared by allocating "1" when the pixel is included in the attentive focused image and "0" when the pixel is not included in the attentive focused image, and a second map is prepared by allocating "1" when the pixel is included in the attentive disparity range and "0" when the pixel is not included in the attentive disparity range. Then, a rough object extraction is performed by obtaining a logical AND between the first map, the second map and an input image.

Furthermore, on the basis of the clustering result obtained concerning the attentive disparity image, a large integrated cluster is constituted by collecting clusters having a statistically similar feature. Then, for each of the obtained integrated clusters, the number of pixels included in the result of the above mentioned rough object extraction are counted, and a ratio of the counted number to the number of all pixels included in the integrated cluster is calculated. The integrated cluster having the obtained ratio larger than a predetermined value is selected. A set of the selected integrated clusters are considered as a final result of the object extraction.

The result of the rough object extraction by itself often includes an erroneous detection region attributable to the sharpening and to the disparity detection. However, by combining the result of the rough object extraction and the result of the integration of clustering of the disparity image, the erroneous detection can be greatly reduced.

Figure 2:
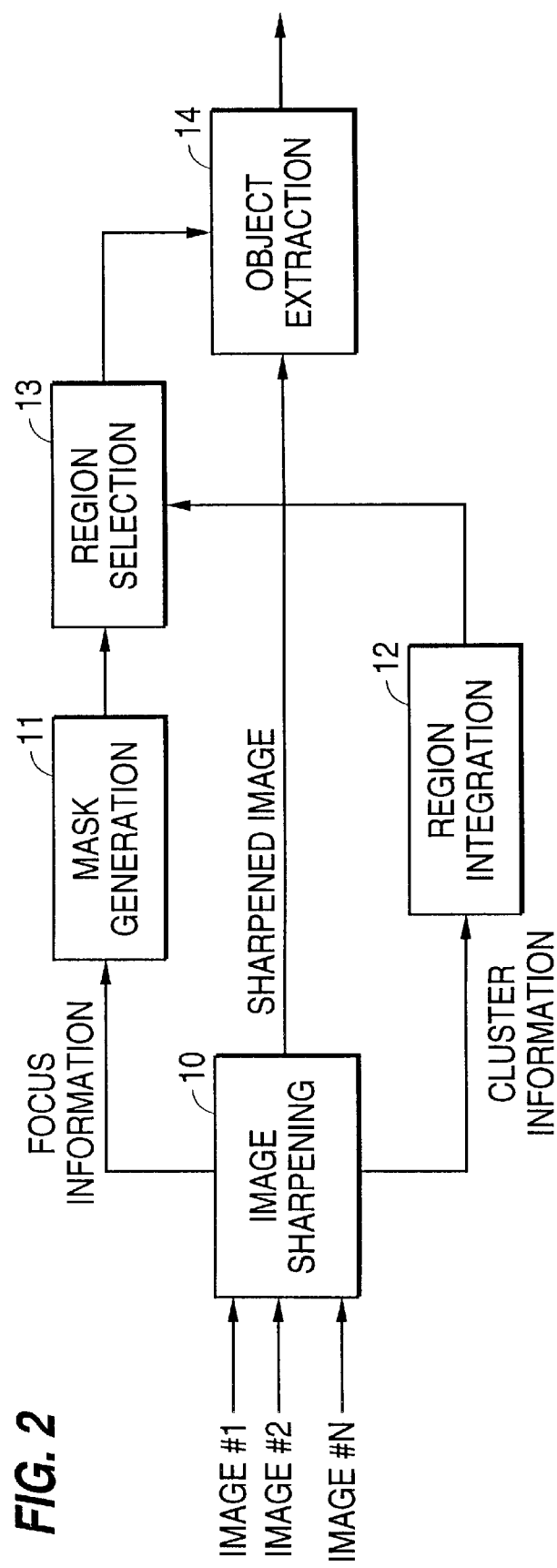
FIG. 2 is a block diagram of a first embodiment of the object detection system in accordance with the present invention.

Referring to FIG. 2, there is shown a block diagram of a first embodiment of the object detection system in accordance with the present invention, utilizing the image sharpening scheme.

The shown object detection system includes an image sharpening means 10 receiving "N" images having substantially the same optical axis and different focus positions, and for generating a sharpened image, a focus information for each pixel, and a cluster information as the result of a region segmentation. Here, the focus information is an index that indicates from which of the "N" images a corresponding pixel is obtained, and the cluster information is constituted of the mean value of the luminance of each cluster, a mean value of the color difference of each cluster, a gravity center position of each cluster, and the cluster number to which a corresponding pixel belongs. The focus information is supplied to a mask generating means 11, which generates a mask information corresponding to a rough object detection. This mask information is formed, in units of pixel, by giving "1" when a corresponding pixel is obtained from an attentive focus image and "0" when a corresponding pixel is not obtained from an attentive focus image.

The cluster information is supplied to a region integrating means 12, which generates a new and large integrated cluster by integrating clusters having a statistically similar feature, and outputs an integrated cluster information concerning the generated new and large integrated cluster. This integrated cluster information is an index indicative of the integrated cluster in which each pixel is included.

The mask information outputted from the mask generating means 11 and the integrated cluster information outputted from the region integrating means 12, are supplied to a region selecting means 13, which calculates the proportion of the pixels having the mask information of "1" in each of the integrated clusters, and outputs an object detection information constituted of a set of integrated clusters having the proportion larger than a predetermined value. This object detection information is formed, in units of pixel, by giving "1" when a corresponding pixel is included in an integrated region constituting the detected object and "0" when a corresponding pixel is not included in the integrated region constituting the detected object.

The sharpened image outputted from the image sharpening means 10 and the object detection information outputted from the region selecting means 13 are supplied to an object extracting means 14, which calculates a logical AND between tie sharpened image and the object detection information, and outputs the result of the calculation as the detected object.

Figure 3:
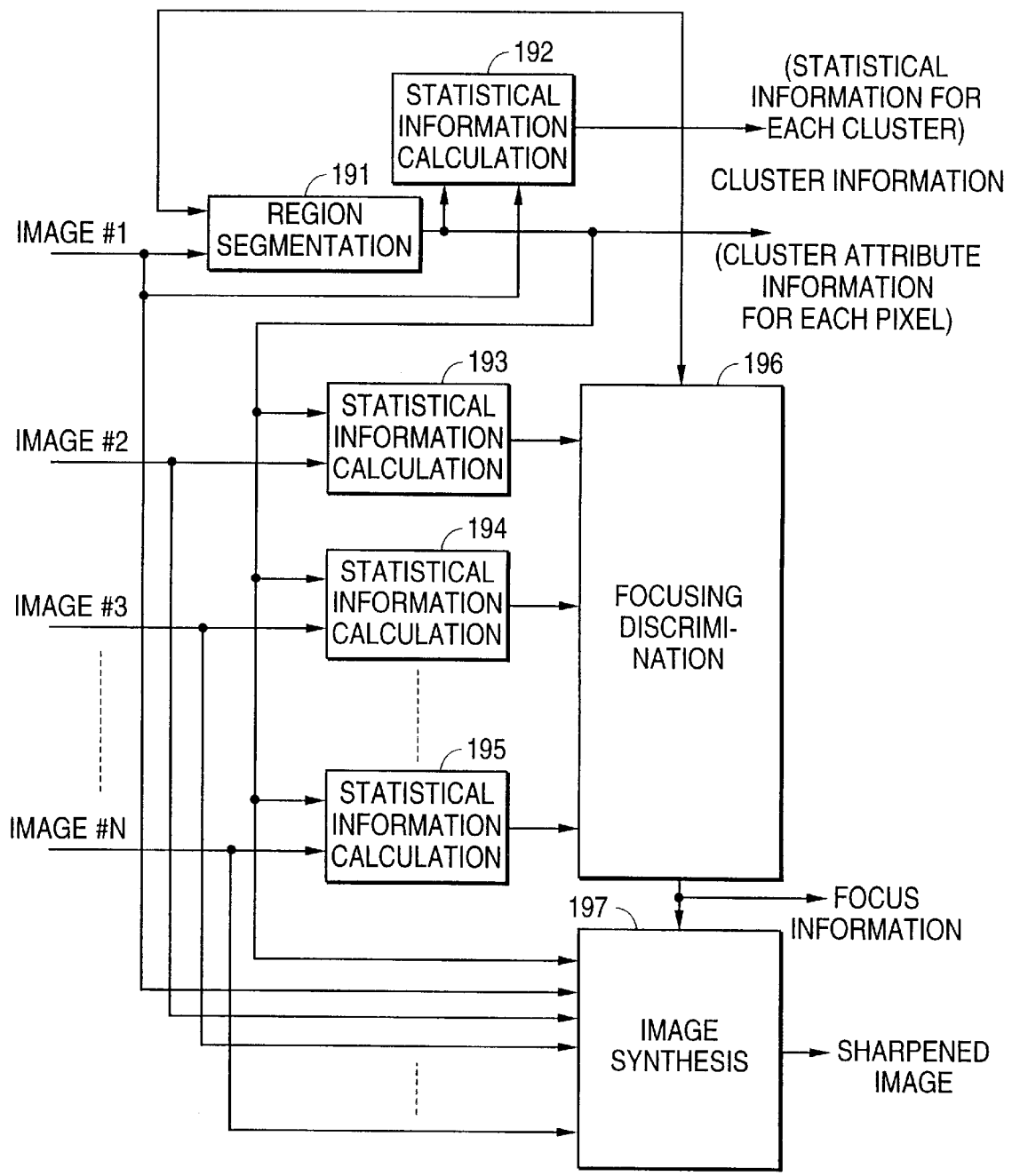
FIG. 3 is a block diagram illustrating a detailed structure of the image sharpening means included in the system shown in FIG. 2.

Referring to FIG. 3, there is shown a block diagram illustrating a detailed structure of the image sharpening means 10 shown in FIG. 2.

As a reference image, one image is selected from the "N" images having substantially the same optical axis and different focus positions, and the reference image is designated by #1. A region segmentation means 191 receives pixel values of the reference image #1 and a statistical information given from a statistical information calculating means 192, and conducts a region segmentation of the reference image #1 in accordance with the distance calculating equation (1) mentioned hereinbefore, and outputs a cluster attribute information for each pixel, which indicates the cluster number of the cluster in which each pixel is included. The statistical information calculating means 192 receives the pixel values of the reference image #1 and the cluster attribute information supplied from the region segmentation means 191, and calculates a mean value, a variance, and a gravity center position, of the pixel values in each cluster, for outputting the calculated values as statistical information for each cluster.

A statistical information calculating means 193 receives the pixel values of an image #2 and the cluster attribute information for the reference image #1 supplied from the region segmentation means 191, and applies the clusters obtained for the reference image #1, to the image #2, and calculates a mean value, a variance, and a gravity center position, of the pixel values in each cluster, so as to output the calculated values as statistical information for each cluster. Each of statistical information calculating means 194 to 195 has the same function as that of the statistical information calculating means 193, but exerts the function for a corresponding image #3 to #N. Similar to the "Literature 1" referred to hereinbefore, a focusing discriminating means 196 receives the statistical information for the images #1 to #N supplied form the statistical information calculating means 192 to 195, and executes the following calculation:

$$\sum_{n' \in N} \left[ (\overline{Y}_n - \overline{Y}_{n'})^2 + (\overline{Cr}_n - \overline{Cr}_{n'})^2 + (\overline{Cb}_n - \overline{Cb}_{n'})^2 \right] \qquad (3)$$

In addition, it is discriminated that the cluster giving a maximum value of the result of the above equation (3) is a focused region, which is outputted as the focus information. Here, ($\overline{Y}n, \overline{Cr}n, \overline{Cb}n$) is a mean value of the luminance and the color differences of an attentive cluster "n", and N is a set of clusters adjacent to the attentive cluster "n".

An image synthesis means 197 receives the cluster attribute information of the reference image #1 supplied from the region segmentation means 191, the focus information supplied from the focusing discriminating means 196, and the "N" images having substantially the same optical axis and the different focus positions, and outputs a sharpened image.

Figure 4:
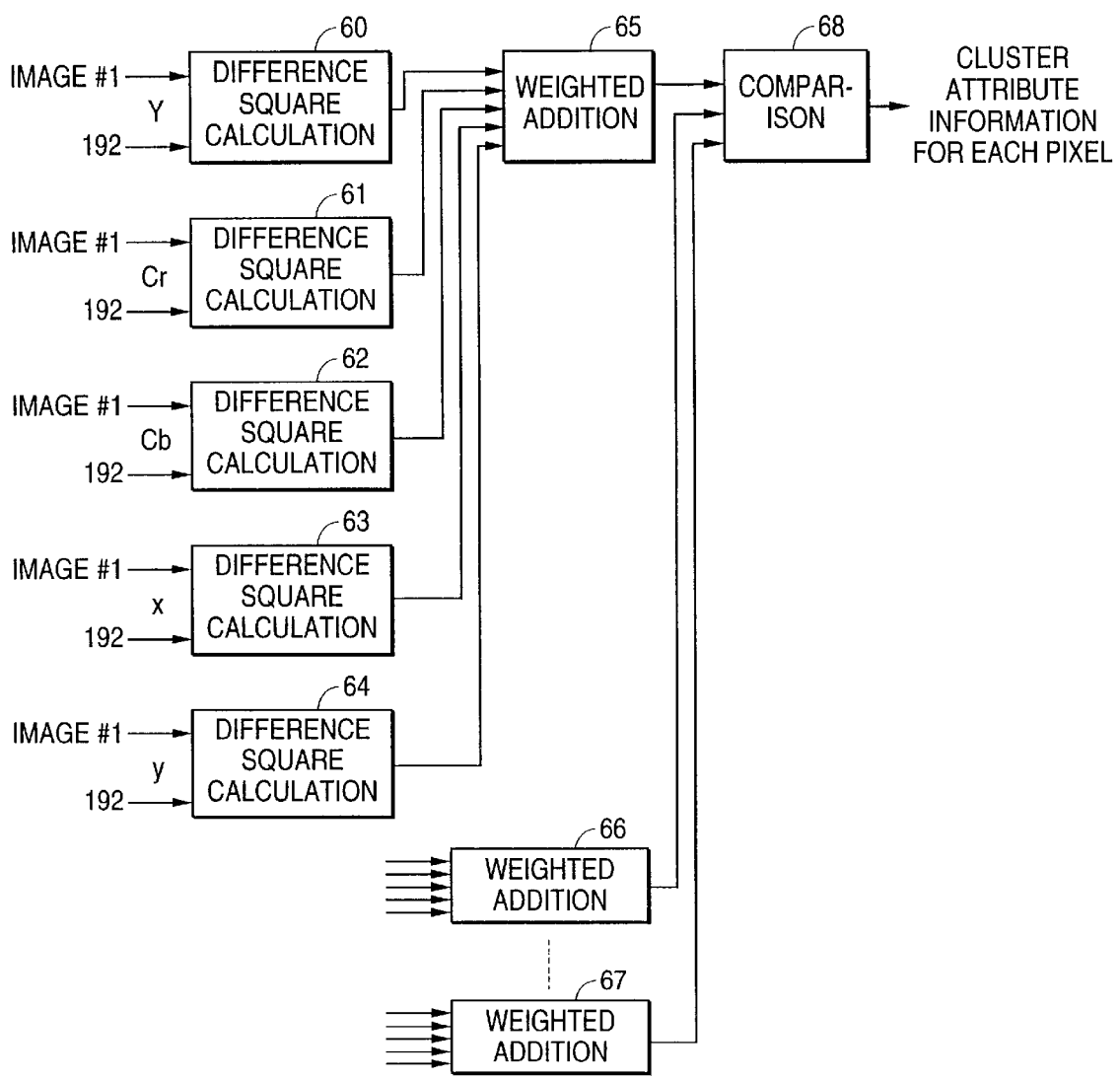
FIG. 4 is a block diagram illustrating a detailed structure of the region segmentation means included in the image sharpening means shown in FIG. 3.

Referring to FIG. 4, there is shown a block diagram illustrating a detailed structure of the region segmentation means 191 shown in FIG. 3.

A difference square calculation means 60 receives a value of a luminance (Y) of the image #1 and the mean value of the luminance for each cluster supplied from the statistical information calculating means 192, and calculates a square of a difference between the received values. Each of difference square calculation means 61 and 62 receives a corresponding color difference value (Cr or Cb) of the image #1 and the mean value of the corresponding color difference for each cluster supplied from the statistical information calculating means 192, and calculates a square of a difference between the received values. Each of difference square calculation means 63 and 64 receives a corresponding position information (x or y) of the image #1 and the mean value of the gravity center position information for each cluster supplied from the statistical information calculating means 192, and calculates a square of a difference between the received information. A weighted addition means 65 receives the difference square value supplied from each of the difference square calculation means 60 to 64, and conducts a weighted addition for the received difference square values in accordance with the equation (1) mentioned hereinbefore. Each of weighted addition means 66 to 67 executes the weighted addition of difference square values for each of adjacent clusters, similarly to the weighted addition means 65. A comparison means 68 mutually compares the weighted addition values supplied from the weighted addition means 65 to 67, and outputs The index of the cluster giving a minimum weighted addition value of the weighted addition values, as the cluster attribute information.

Figure 5:
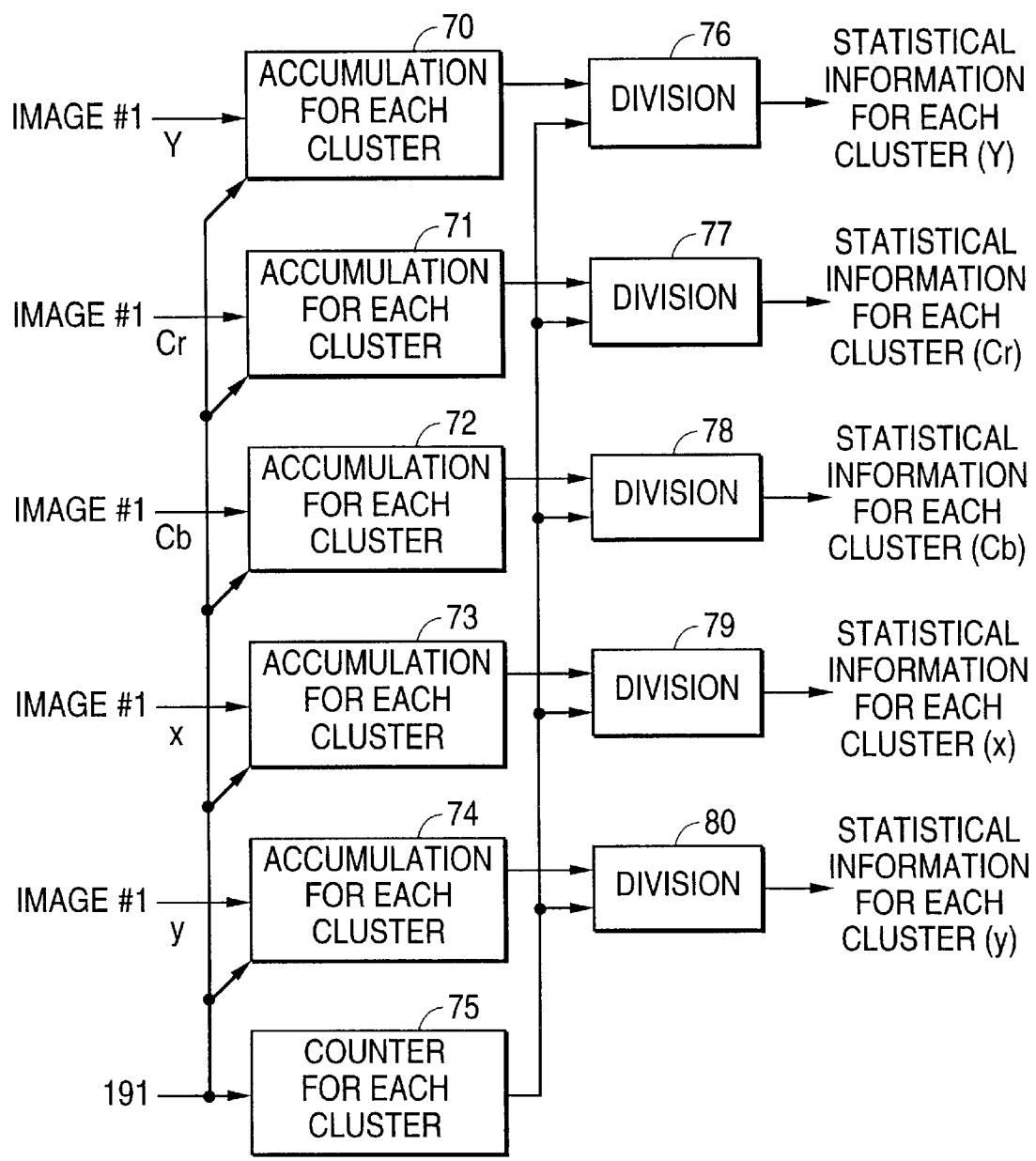
FIG. 5 is a block diagram illustrating a detailed structure of the statistical information calculating means included in the image sharpening means shown in FIG. 3.

Referring to FIG. 5, there is shown a block diagram illustrating a detailed structure of the statistical information calculating means 192 shown in FIG. 3.

An accumulation means 70 for each cluster accumulates the luminance value (Y) of the pixel given from the image #1, in accordance with the cluster attribute information for each pixel supplied from the region segmentation means 191, to generate an accumulated value of the luminance values for each cluster. Each of accumulation means 71 and 72 for each cluster accumulates the color difference value (Cr or Cb) of the pixel given from the image #1, in accordance with the cluster attribute information for each pixel supplied from the region segmentation means 191, to generate an accumulated value of the color difference values for each cluster. Each of accumulation means 73 and 74 for each cluster accumulates the position coordinate (x or y) of the pixel given from the image #1, in accordance with the cluster attribute information for each pixel supplied from the region segmentation means 191, to generate an accumulated value of the position coordinates for each cluster. A counter 75 for each cluster counts the number of pixels included in each cluster, in accordance with the cluster attribute information for each pixel supplied from the region segmentation means 191. A division means 76 divides the accumulated value of the luminance values for each cluster, supplied from the accumulation means 70, by the count value, namely, the number of pixels for each cluster, supplied from the counter 75, for outputting the mean value of the luminance values for each cluster. Division means 77 and 78 divide the accumulated value of the color difference values for each cluster, supplied from the accumulation means 71 and 72, by the number of pixels for each cluster supplied from the counter 75, for outputting the mean value of the color difference values for each cluster. Division means 79 and 80 divide the accumulated value of the position coordinate values for each cluster, supplied from the accumulation means 73 and 74, by the number of pixels for each cluster supplied from the counter 75, for outputting the gravity center position for each cluster.

Figure 6:
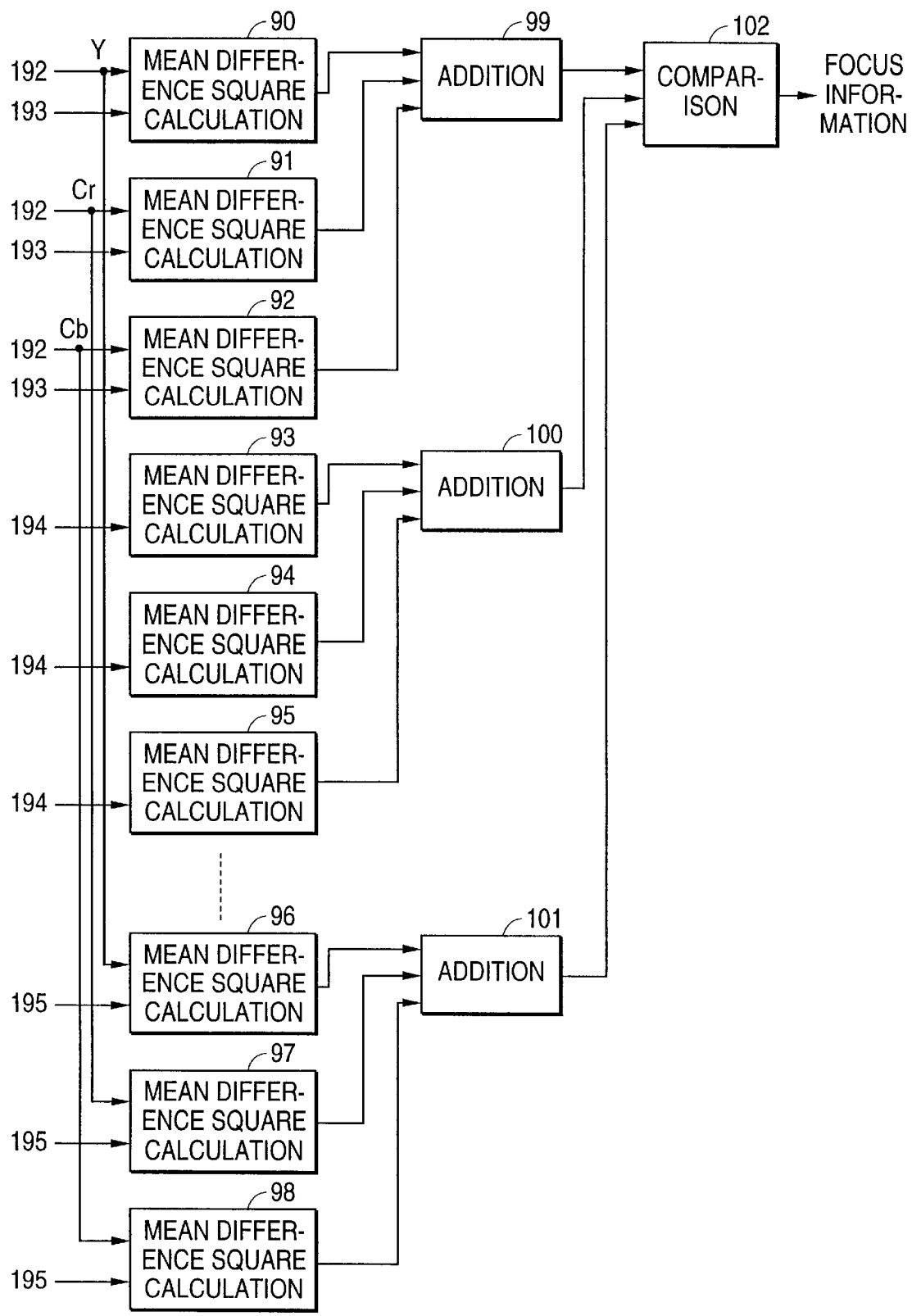
FIG. 6 is a block diagram illustrating a detailed structure of the focusing discriminating means included in the image sharpening means shown in FIG. 3.

Referring to FIG. 6, there is shown a block diagram illustrating a detailed structure of the focusing discriminating means 196 shown in FIG. 3.

A mean difference square calculation means 90 receives the mean luminance value (Y) of the attentive cluster supplied from the statistical information calculating means 192 and the mean luminance value of the neighbor cluster supplied from the statistical information calculating means 193, and calculates a square of a difference between the received mean luminance values. Each of mean difference square calculation means 90 receives the mean color difference value (Cr or Cb) of the attentive cluster supplied from the statistical information calculating means 192 and the mean color difference value of the neighbor cluster supplied from the statistical information calculating means 193, and calculates a square of a difference between the received mean color difference values. Mean difference square calculation means 93, 94 and 95 have the functions similar to that of the mean difference square calculation means 90, 91 and 92, respectively, but receives the statistical values supplied from the statistical information calculating means 194, in place of the statistical information calculating means 193. Similarly, mean difference square calculation means 96, 97 and 98 have the functions similar to that of the mean difference square calculation means 90, 91 and 92, respectively, but receive the statistical values supplied from the statistical information calculating means 195, in place of the statistical information calculating means 193.

An addition means 99 receives and adds the values supplied from the mean difference square calculation means 90, 91 and 92, and an addition means 100 receives and adds the values supplied from the mean difference square calculation means 93, 94 and 95. An addition means 101 receives and adds the values supplied front the mean difference square calculation means 96, 97 and 98, and a comparison means 102 receives and mutually compares output values supplied from the addition means 99 to 101, and outputs, as the focus information, the index of the image including the cluster giving a maximum value of the added value.

Figure 7:
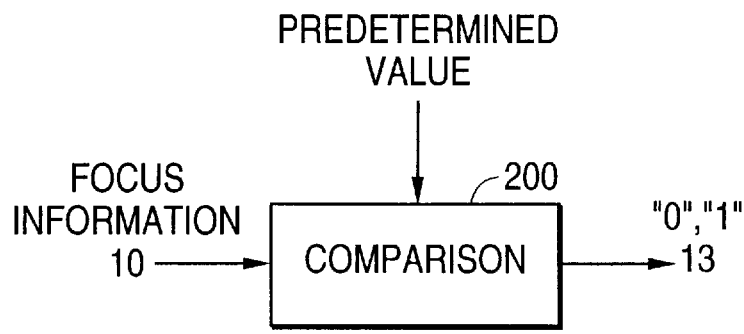
FIG. 7 is a block diagram illustrating a detailed structure of the mask generating means included in the system shown in FIG. 2.

Referring to FIG. 7, there is shown a block diagram illustrating a detailed structure of the mask generating means 11 shown in FIG. 2.

The mask generating means 11 includes a comparison means 200 receiving the focus information supplied from the image sharpening means 10, and outputs, as the mask information, "1" when the received value corresponds to a predetermined focused image, and "0" when the received value does not correspond to a predetermined focused image.

Figure 8:
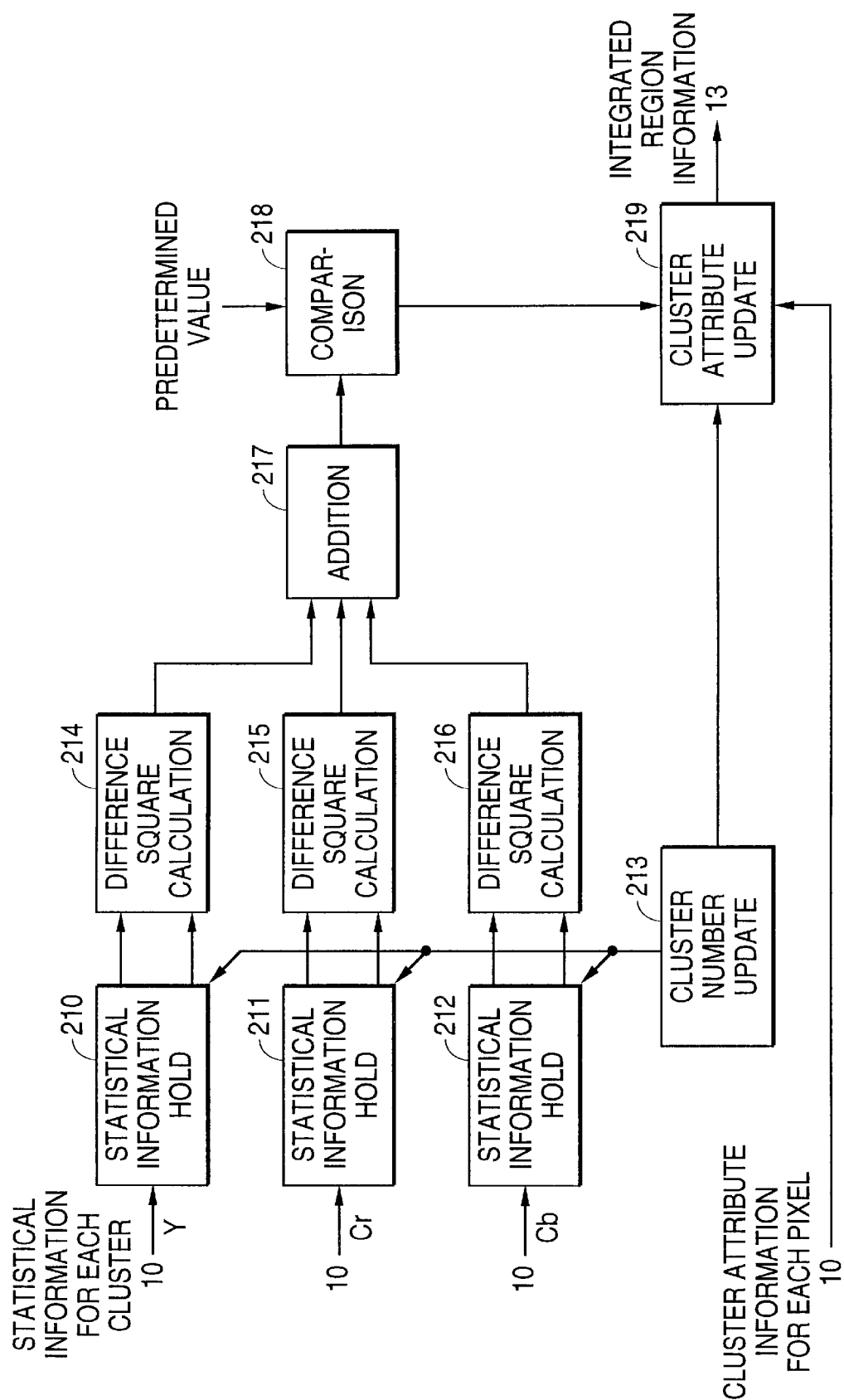
FIG. 8 is a block diagram illustrating a detailed structure of the region integrating means included in the system shown in FIG. 2.

Referring to FIG. 8, there is shown a block diagram illustrating a detailed structure of the region integrating means 12 shown in FIG. 2.

The region integrating means 12 includes statistical information holding means 210, 211 and 212 for respectively receiving and holding the statistical information concerning the luminance (Y) and the color differences (Cr and Cb) for each cluster, supplied from the image sharpening means 10, and for outputting the statistical information concerning the luminance (Y) and the color differences (Cr and Cb) for the cluster corresponding to the cluster number generated by a cluster number generating means 213. Each of difference square means 214, 215 and 216 calculates a square of a difference between the statistical information of two clusters supplied from a corresponding one of the statistical information holding means 210, 211 and 212. An addition means 217 receives and adds output values outputted from the difference square means 214, 215 and 216, and a comparison means 218 compares an output value of the addition means 217 with a predetermined value, and outputs, as a cluster integration discrimination result, "1" when the output value of the addition means 217 is smaller than the predetermined value and "0" when the output value of the addition means 217 is not smaller than the predetermined value. If the cluster integration discrimination result is "1", it means that the cluster integration is conducted.

A cluster attribute update means 219 receives the cluster attribute information for each pixel supplied from the image sharpening means 10, the cluster number supplied from the cluster number generating means 213, and the cluster integration discrimination result supplied from the comparison means 218. When the cluster integration discrimination result is "1", the cluster attribute update means 219 updates the cluster attribute information of the pixel to the effect that two clusters have the same cluster number. The updated information is outputted as the integrated cluster information. Namely, this integrated cluster information is an index, in units of pixel, indicating the integrated cluster in which the pixel is included.

Figure 9:
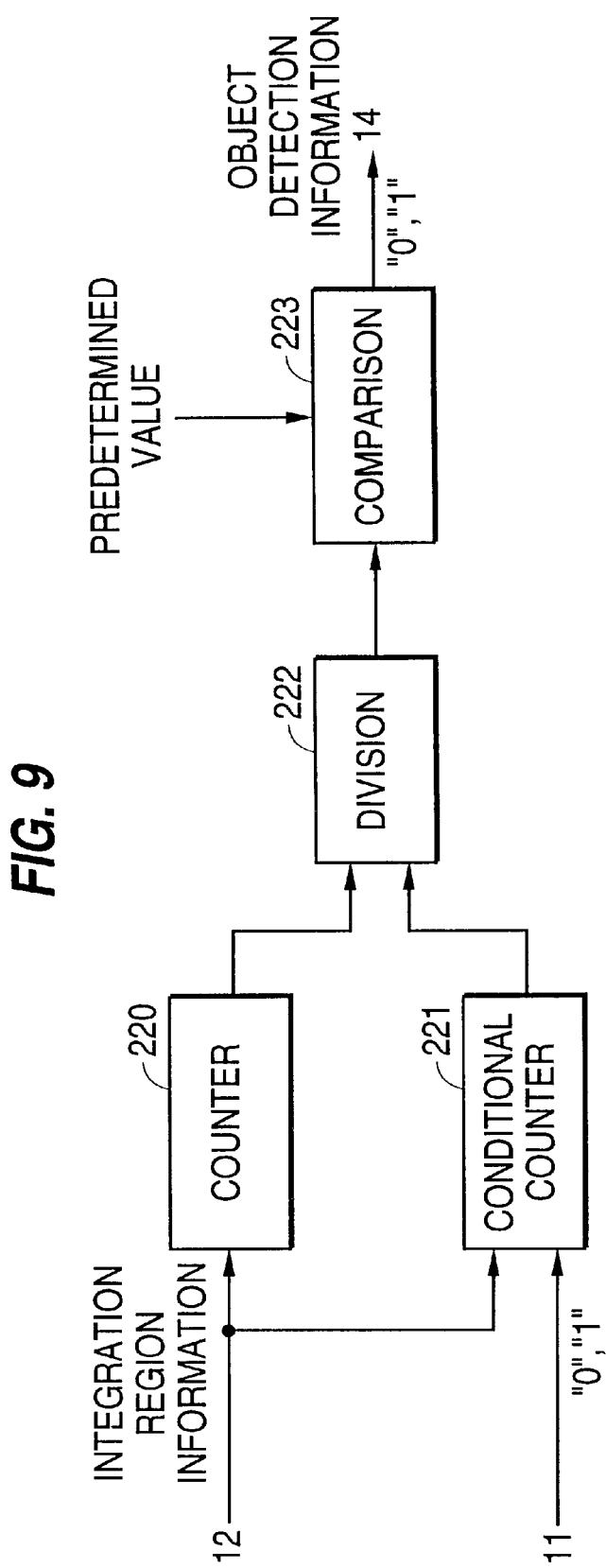
FIG. 9 is a block diagram illustrating a detailed structure of the region selecting means included in the system shown in FIG. 2.

Referring to FIG. 9, there is shown a block diagram illustrating a detailed structure of the region selecting means 13 included in the system shown in FIG. 2.

The region selecting means 13 includes a counter Z20 receiving the integrated cluster information supplied from the region integration means 12, for counting the number of pixels included in each integrated cluster. A conditional counter 221 receives the integrated cluster information supplied from the region integration means 12 and the mask information supplied from the mask generating means 11, for counting the number of the pixels which are included in each integrated cluster and correspond to "1" of the mask information. A division means 222 divides the number of pixels supplied from the conditional counter 221 by the number of pixels supplied from the counter 220. A comparison means 223 compares the result of division outputted from the division means 222 with a predetermined value, and outputs, as the object detection information, "1" when the result of division outputted from the division means 222 is not smaller than the predetermined value, and "0" when the result of division outputted from the division means 222 is smaller than the predetermined value.

Figure 10:
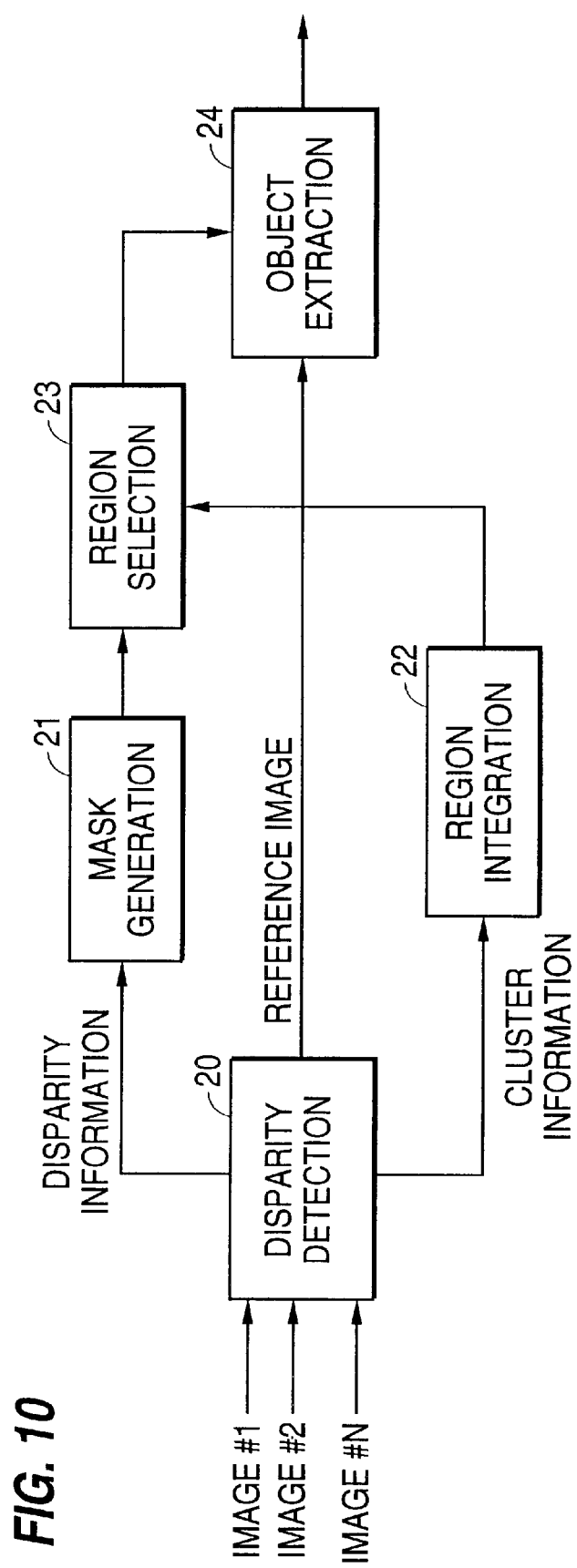
FIG. 10 is a block diagram of a second embodiment of the object detection system in accordance with the present invention.

Referring to FIG. 10, there is shown a block diagram of a second embodiment of the object detection system in accordance with the present invention, utilizing the disparity detecting scheme.

The shown second embodiment of the object detection system includes a disparity detection means 20 receiving "M" images having substantially the same focus depth and different optical axes, namely, different disparities, and for generating one reference image, a disparity information for each pixel, and a cluster information as the result of a region segmentation. Here, the disparity information is a disparity obtained for each pixel, and the cluster information is constituted of the mean value of the luminance of each of clusters obtained as the result of the region segmentation, a mean value of the color difference of each cluster, a gravity center position of each cluster, and the cluster number to which a corresponding pixel belongs. The disparity information is supplied to a mask generating means 21, which generates a mask information corresponding to a rough object extraction. This mask information is formed, in units of pixel, by giving "1" if a corresponding pixel is included in an attentive disparity range and "0" if not so.

The cluster information is supplied to a region integration means 22, which generates a new and large integrated cluster by integrating clusters having a statistically similar feature, and outputs an integrated cluster information concerning the generated new and large integrated cluster. This integrated cluster information is an index indicative of the integrated cluster in which each pixel is included.

The mask information outputted from the mask generating means 21 and the integrated cluster information outputted from the region integrating means 22, are supplied to a region selecting means 23, which calculates the proportion of the pixels having die mask information of "1" in each of the integrated clusters, and outputs an object detection information constituted of a set of integrated clusters having the proportion larger than a predetermined value. This object detection information is formed, in units of pixel, by giving "1" when a corresponding pixel is included in an integrated region constituting the detected object and "0" when a corresponding pixel is not included in the integrated region constituting the detected object.

The reference image outputted from the disparity detection means 20 and the object detection information outputted from the region selecting means 23 are supplied to an object extracting means 24, which calculates a logical AND between the reference image and the object detection information, and outputs the result of the calculation as the detected object.

Figure 11:
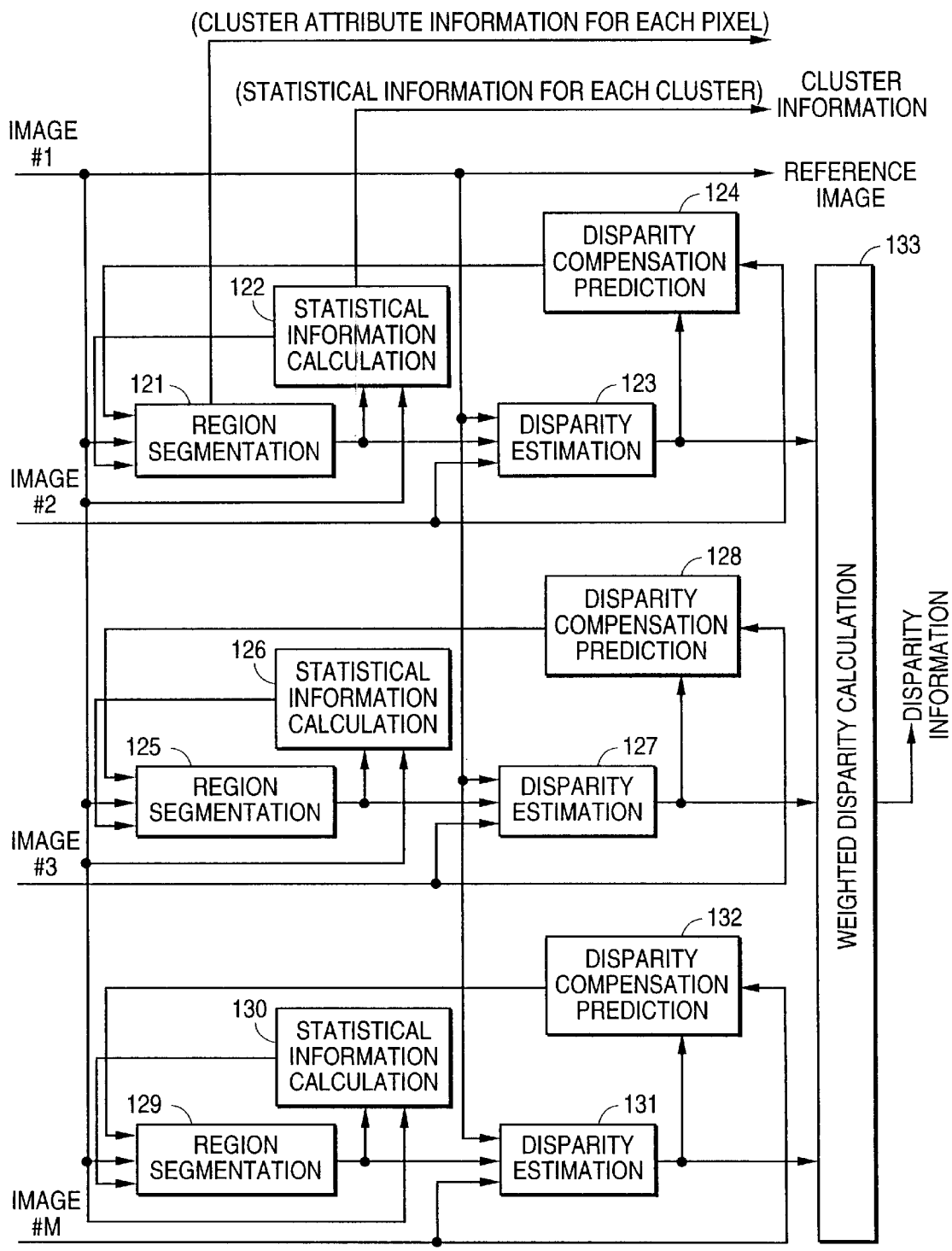
FIG. 11 is a block diagram illustrating a detailed structure of the disparity detecting means included in the system shown in FIG. 10.

Referring to FIG. 11, there is shown a block diagram illustrating a detailed structure of the disparity detection means 20 shown in FIG. 10. One image is selected, as a reference image #1, from the "M" images having different disparities, and a disparity detection is conducted between this reference image and each of the other images, for the purpose of determining the disparity of each pixel.

A region segmentation means 121 receives the pixel values of the image #1, the statistical information for each cluster supplied from a statistical information calculating means 122, and a disparity compensation predicted image generated by a disparity compensation prediction means 124, and executes a region segmentation of the image #1, by performing the following eight-dimensional distance calculation shown in the "literature 1" referred to hereinbefore.

$$d_n^2 = w_0 \cdot [(Y - \overline{Y_n})^2 + (Cr - \overline{Cr_n})^2 + (Cb - \overline{Cb_n})^2] + \quad (4)$$
$$w_1 \cdot [(x - \overline{x_n})^2 + (y - \overline{y_n})^2] +$$
$$w_2 \cdot [(Y - Y'_{\vec{v_n}})^2 + (Cr - Cr'_{\vec{v_n}})^2 + (Cb - Cb'_{\vec{v_n}})^2]$$

where (Y, Cr, Cb) are a luminance and color differences of the attentive pixel;

(x, y) are coordinate positions of the attentive pixel;

($\overline{Yn}, \overline{Crn}, \overline{Cbn}$) are mean values a luminance and color differences of the cluster "n";

($\overline{xn}, \overline{yn}$) are gravity center coordinate positions of the cluster "n";

($Y'\vec{vn}, Cr'\vec{vn}, Cb'\vec{vn}$) are pixel values of the reference image indicated by a disparity vector $\vec{V}n$ detected for the cluster "n"; and ($w_0, w_1, w_2$) are weighting coefficients.

The statistical information calculating means 122 receives the pixel values of the reference image #1 and the cluster attribute information supplied from the region segmentation means 121, and calculates a mean value, a variance, and a gravity center position, of the pixel values in each cluster, for outputting the calculated values as statistical information for each cluster.

A disparity estimator means 123 receives the pixel values of the reference image #1, the pixel value of an image #2, and the cluster attribute information supplied from the region segmentation means 121, and calculates a disparity vector of a horizontal one-dimension, for each cluster, which minimizes an error of the disparity compensation prediction image.

The disparity compensation prediction means 124 receives the pixel value of an image #2 and the disparity vector supplied from the disparity estimation means 123, and generates the disparity compensation prediction image for the reference image #1.

By repeating the above mentioned operation, it is possible to obtain the disparity information which sufficiently reduces the disparity compensation prediction error.

Each of region segmentation means 125 and 129 has the same function as that of the region segmentation means 121, and each of statistical information calculating means 126 and 130 has the same function as that of the statistical information calculating means 122. Each of disparity estimation means 127 and 131 has the same function as that of the disparity estimation means 123, and each of disparity compensation prediction means 128 and 132 has the same function as that of the disparity compensation prediction means 124.

A weighted disparity calculation means 133 receives a plurality of disparity vectors supplied from the disparity estimation means 123, 127 and 131, and calculates the mean value weighted in accordance with the distance of a base line of an image pick-up system, so as to output a final disparity information for each pixel.

Figure 12:
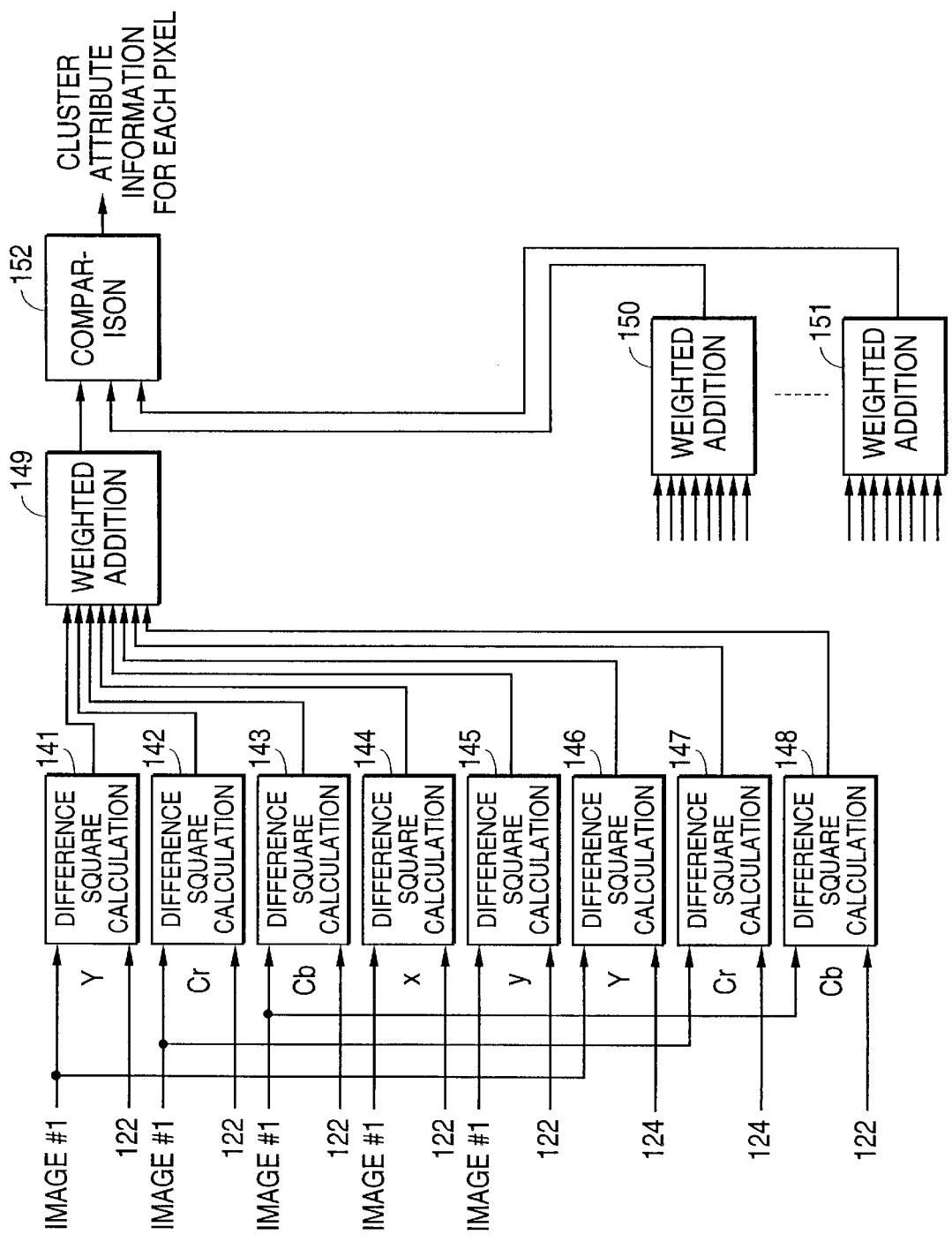
FIG. 12 is a block diagram illustrating a detailed structure of the region segmentation means included in the disparity detecting means shown in FIG. 11.

Referring to FIG. 12, there is shown a block diagram illustrating a detailed structure of the region segmentation means 121 shown in FIG. 11.

A difference square calculation means 141 receives a value of a luminance (Y) of the image #1 and the mean luminance value of each cluster supplied from the statistical information calculating means 122, and calculates a square of a difference between the received values. Each of difference square calculation means 142 and 143 receives a corresponding color difference value (Cr or Cb) of the image #1 and the corresponding mean color difference value of each cluster supplied from the statistical information calculating means 122, and calculates a square of a difference between the received values. Each of difference square calculation means 144 and 145 receives a corresponding position information (x or y) of the image #1 and the corresponding gravity center position information value of each cluster supplied from the statistical information calculating means 122, and calculates a square of a difference between the received information.

A difference square calculation means 146 receives a value of a luminance (Y) of the image #1 and the luminance value of the disparity compensation prediction image for the reference image #1, supplied from the disparity compensation prediction means 124, and calculates a square of a difference between the received values. Each of difference square calculation means 147 and 148 receives a corresponding color difference value (Cr or Cb) of the image #1 and the corresponding color difference value of the disparity compensation prediction image for the reference image #1, supplied from the disparity compensation prediction means 124, and calculates a square of a difference between the received values.

A weighted addition means 149 receives the difference square value supplied from each of the difference square calculation means 141 to 148, and conducts a weighted addition for the received difference square values in accordance with the equation (4) mentioned hereinbefore. Similarly to the weighted addition means 149, each of weighted addition means 150 to 151 executes the weighted addition of difference square values for each of adjacent clusters different from the cluster processed by the weighted addition means 149. A comparison means 152 mutually compares the weighted addition values supplied from the weighted addition means 149 to 151, and outputs the index of the cluster giving a minimum weighted addition value of the weighted addition values, as the cluster attribute information for each pixel.

The statistical information calculating means 122 is constructed similarly to the statistical information calculating means 192 mentioned hereinbefore, and therefore, explanation of a detailed construction will be omitted.

Figure 13:
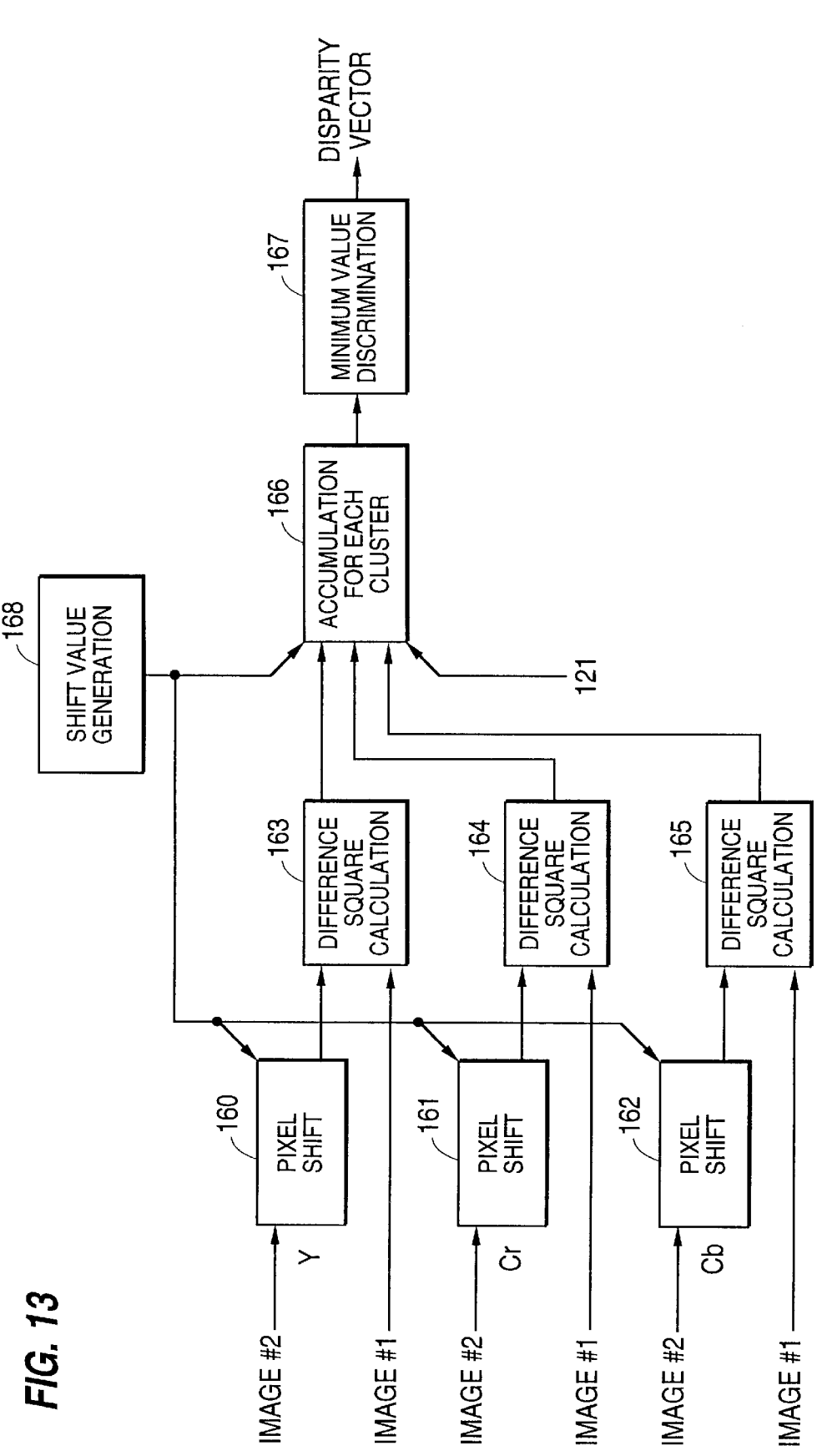
FIG. 13 is a block diagram illustrating a detailed structure of the disparity estimating means included in the disparity detecting means shown in FIG. 11.

Referring to FIG. 13, there is shown a block diagram illustrating a detailed structure of the disparity estimating means 123 shown in FIG. 11.

A pixel shift means 160 shifts the luminance value (Y) of the pixel of the image #2 in a horizontal direction in accordance with a pixel shift value generated by a shift value generating means 168. Each of pixel shift means 161 and 162 shifts the corresponding color difference value (Cr or Cb) of the pixel of the image #2 in the horizontal direction in accordance with the shift value generated by the shift value generating means 168. A difference square calculating means 163 receives the luminance value (Y) of the pixel of the image #1 and the luminance value (Y) of the pixel of the image #2 shifted in the horizontal direction by the pixel shift means 160, and calculates a square of a difference between the received values. Each of difference square calculating means 164 and 165 receives the corresponding color difference value (Cr or Cb) of the pixel of the image #1 and the corresponding color difference value (Cr or Cb) of the pixel of the image #2 shifted in the horizontal direction by the pixel shift means 161 or 162, and calculates a square of a difference between the received values. An accumulation means 166 for each cluster accumulates the output values of the difference square calculating means 163 to 165, in units of shift value, and in units of cluster, in accordance with the shift value generated by the shift value generating means 168 and in accordance with the cluster attribute information supplied from the region segmentation means 121. A minimum value discrimination means 167 receives an output of the accumulation means 166, for discriminating and selecting, in units of cluster, the shift value which minimizes the accumulated difference square value outputted from the accumulation means 166, and for outputting the selected shift value as the disparity vector.

Figure 14:
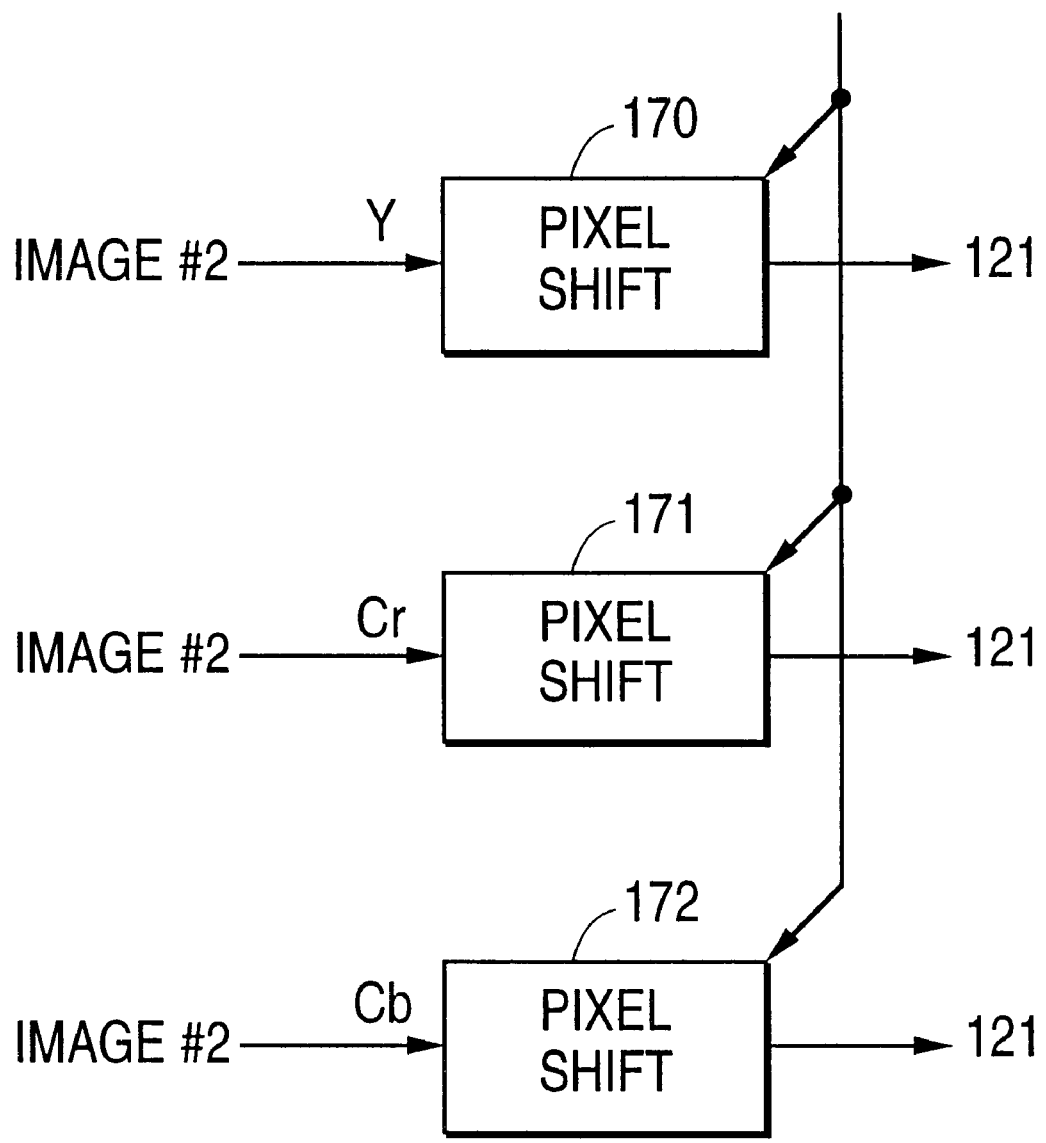
FIG. 14 is a block diagram illustrating a detailed structure of the disparity compensation predicting means included in the disparity detecting means shown in FIG. 11.

Referring to FIG. 14, there is shown a block diagram illustrating a detailed structure of the disparity compensation predicting means 124 shown in FIG. 11.

The disparity compensation predicting means 124 includes a pixel shift means 170 receives the luminance value (Y) of the pixel in the image #2, and shifts the luminance value of the pixel in a horizontal direction in accordance with the disparity vector supplied from the disparity estimating means 123. Each of the pixel shift means 171 and 172 receives the corresponding color difference value (Cr or Cb) of the pixel in the image #2, and shifts the corresponding color difference value of the pixel in the horizontal direction in accordance with the disparity vector supplied from the disparity estimating means 123.

The mask generating means 21 has fundamentally the same construction as that of the mask generating means 11, excepting that the mask generating means 21 receives die disparity information in place of the focus information, and outputs "1" when the received disparity information is in a predetermined disparity range and "0" if it is not so.

The region integration means 22 and the region selection means 23 correspond to the region integration means 12 and the region selection means 13 of the first embodiment, respectively.

Figure 15:
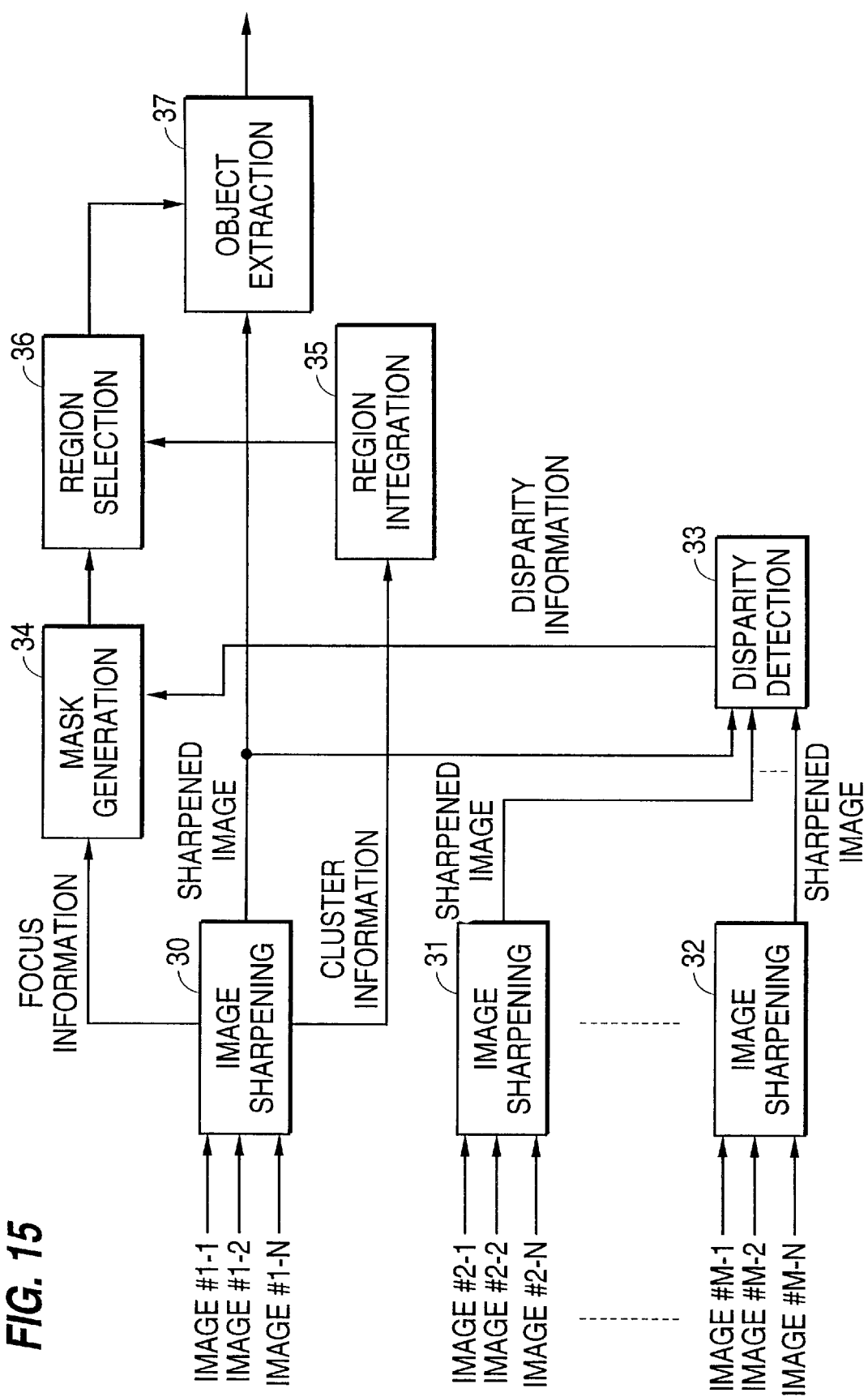
FIG. 15 is a block diagram of a third embodiment of the object detection system in accordance with the present invention.

Referring to FIG. 15, there is shown a block diagram of a third embodiment of the object detection system in accordance with the present invention, which utilize both of the image sharpening scheme and the disparity detecting scheme.

The shown third embodiment of the object detection system includes an image sharpening means 30 receiving "N" images (#1-1 to #1-N) having substantially the same optical axis and different focus positions, and for generating a sharpened image, a focus information for each pixel, and a cluster information as the result of a region segmentation. Here, the focus information is an index that indicates from which of the "N" images a corresponding pixel is obtained, and the cluster information is constituted of a mean luminance value of each of clusters obtained as the result of the region segmentation, a mean color difference value of each cluster, a gravity center position of each cluster, and the cluster number to which a corresponding pixel belongs. Each of image sharpening means 31 and 32 has the same function as that of the image sharpening means 30, but the image sharpening means 31 receives different "N" images (#2-1 to #2-N) having different focus positions, and the image sharpening means 32 receives other different "N" images (#M-1 to #M-N) having different focus positions.

A disparity detection means 33 receiving "M" sharpened images having different disparities, outputted from the image sharpening means 30 to 32, for generating a disparity information for each pixel.

A mask generating means 34 receives the focus information outputted from the image sharpening means 30 and the disparity information outputted from the disparity detection means 33, and generates a mask information corresponding to a rough object detection. This mask information is formed, in units of pixel, as regards the focus information, by giving "1" when a corresponding pixel is obtained from an attentive focus image and "0" when a corresponding pixel is not obtained from the attentive focus image, and as regards the disparity information, by giving "1" when a corresponding pixel is included in an attentive disparity range and "0" when a corresponding pixel is not included in the attentive disparity range, and by obtaining a logical AND between the focus information of "1" or "0" and the disparity information of "1" or "0" for the same pixel.

A region integrating means 35 receives the cluster information outputted from the image sharpening means 30, and generates a new and large integrated cluster by integrating clusters having a statistically similar feature, and outputs an integrated cluster information concerning the generated new and large integrated cluster. This integrated cluster information is an index indicative of the integrated cluster in which each pixel is included.

A region selecting means 36 receives the mask information outputted from the mask generating means 34 and the integrated cluster information outputted from the region integrating means 35, and calculates the proportion of the pixels having the mask information of "1" in each of the integrated clusters, and outputs an object detection information constituted of a set of integrated clusters having the proportion larger than a predetermined value. This object detection information is formed, in units of pixel, by giving "1" when a corresponding pixel is included in an integrated region constituting the detected object and "0" when a corresponding pixel is not included in the integrated region constituting the detected object.

An object extracting means 37 receives the sharpened image outputted from the image sharpening means 30 and the object detection information outputted from the region selecting means 36, and calculates a logical AND between the sharpened image and the object detection information, and outputs the result of the calculation as the detected object.

Figure 16:
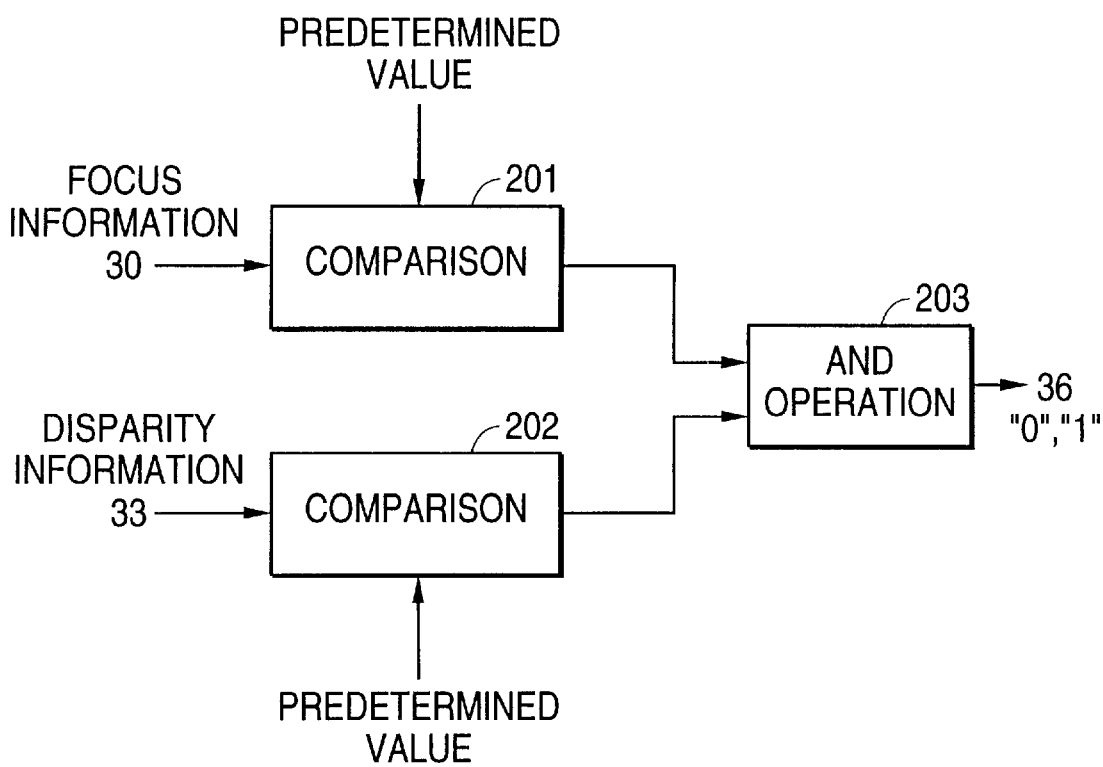
FIG. 16 is a block diagram illustrating a detailed structure of the mask generating means included in the system shown in FIG. 15.

Referring to FIG. 16, there is shown a block diagram illustrating a detailed structure of the mask generating means 34 shown in FIG. 15. The mask generating means 34 includes a comparison means 201 receiving the focus information supplied from the image sharpening means 30, for generating "b 1" when the value of the received focus information corresponds to a predetermined focused image, and "0" when the value of the received focus information does not correspond to a predetermined focused image, and another comparison means 202 receiving the disparity information supplied from the disparity detecting means 22, for generating "1" when the value of the received disparity information is included in a predetermined disparity range and "0" when the value of the received disparity information is not included in a predetermined disparity range. A logical AND means 203 receives an output of the comparison means 201 and an output of the comparison means 202, for outputting the result of the logical AND operation as the mask information.

The region integrating means 35 and the region selecting means 36 have the same construction as those of the region integrating means 12 and the region selecting means 13, respectively.

Figure 17:
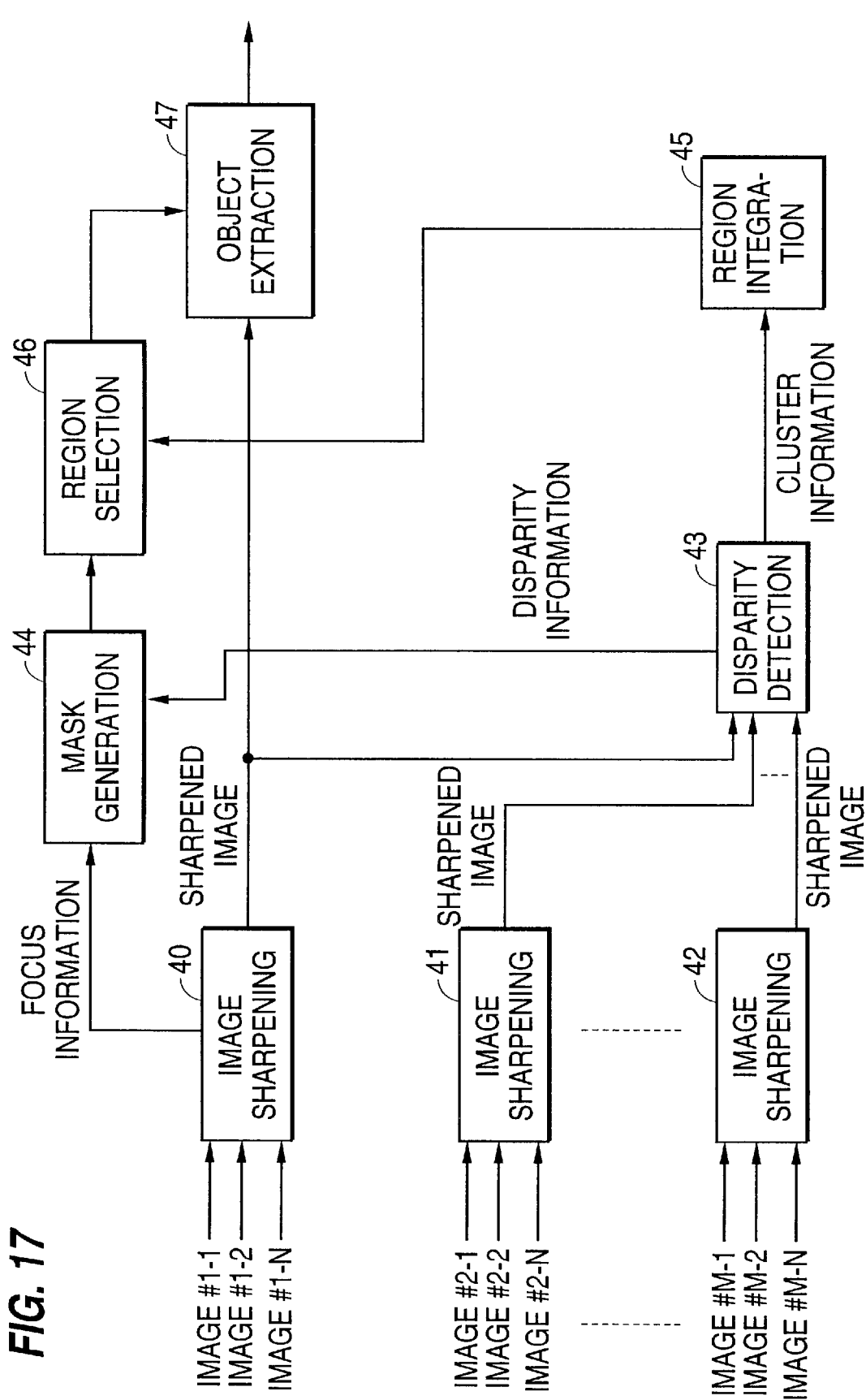
FIG. 17 is a block diagram of a fourth embodiment of the object detection system in accordance with the present invention.

Referring to FIG. 17, there is shown a block diagram of a fourth embodiment of the object detection system in accordance with the present invention, which utilize both of the image sharpening scheme and the disparity detecting scheme but which is different from the third embodiment.

The shown fourth embodiment of the object detection system includes an image sharpening means 40 receiving "N" images (#1-1 to #1-N) having substantially the same optical axis and different focus positions, and for generating a sharpened image and a focus information for each pixel. Here, the focus information is an index that indicates from which of the "N" images a corresponding pixel is obtained. Each of image sharpening means 41 and 42 has the same function as that of the image sharpening means 40, but the image sharpening means 41 receives different "N" images (#2-1 to #2-N) having different focus positions, and the image sharpening means 42 receives other different "N" images (#M-1 to #M-N) having different focus positions.

A disparity detection means 43 receiving "M" sharpened images having different disparities, outputted from the image sharpening means 40 to 42, for generating a disparity information for each pixel and a cluster information as the result of a region segmentation. Here, the cluster information is constituted of a mean luminance value of each of clusters obtained as the result of the region segmentation, a mean color difference value of each cluster, a gravity center position of each cluster, and the cluster number to which a corresponding pixel belongs.

A mask generating means 44 receives the focus information outputted from the image sharpening means 40 and the disparity information outputted from the disparity detection means 43, and generates a mask information corresponding to a rough object detection. This mask information is formed, in units of pixel, as regards the focus information, by giving "1" when a corresponding pixel is obtained from an attentive focus image and "0" when a corresponding pixel is not obtained from the attentive focus image, and as regards the disparity information, by giving "1" when a corresponding pixel is included in an attentive disparity range and "0" when a corresponding pixel is not included in the attentive disparity range, and by obtaining a logical AND between the focus information of "1" or "0" and the disparity information of "1" or "0" for the same pixel.

A region integrating means 45 receives the cluster information outputted from the disparity detecting means 43, and generates a new and large integrated cluster by integrating clusters having a statistically similar feature, and outputs an integrated cluster information concerning the generated new and large integrated cluster. This integrated cluster information is an index indicative of the integrated cluster in which each pixel is included.

A region selecting means 46 receives the mask information outputted from the mask generating means 44 and the integrated cluster information outputted from the region integrating means 45, and calculates the proportion of the pixels having the mask information of "1" in each of the integrated clusters, and outputs an object detection information constituted of a set of integrated clusters having the proportion larger than a predetermined value. This object detection information is formed, in units of pixel, by giving "1" when a corresponding pixel is included in an integrated region constituting the detected object and "0" when a corresponding pixel is not included in the integrated region constituting the detected object.

An object extracting means 47 receives the sharpened image outputted from the image sharpening means 40 and the object detection information outputted from the region selecting means 46, and calculates a logical AND between the sharpened image and the object detection information, and outputs the result of the calculation as the detected object.

The mask generating means 44, the region integrating means 45 and the region selecting means 46 have the same construction as those of the mask generating means 44, the region integrating means 12 and the region selecting means 13, respectively.

As mentioned above, the object detection system in accordance with the present invention can realize a stable object detection with a minimized erroneous detection.

The invention has thus been shown and described with reference to the specific embodiments. However, it should be noted that the present invention is in no way limited to the details of the illustrated structures but changes and modifications may be made within the scope of the appended claims.

I claim:

1. An object detecting system based on multiple-eye images for extracting an object image, comprising:

an image sharpening means receiving a plurality of images having substantially the same optical axis and different focus positions, for generating a sharpened image, a focus information and a cluster information;

a mask generating means receiving said focus information for generating a first object detecting information, said first object detecting information comprising information corresponding to a rough object extraction;

a region integrating means receiving said cluster information for generating an integrated cluster information based on information on an integrated cluster obtained by collecting a plurality of clusters having a substantially similar feature;

a region selecting means receiving said first object detecting information and said integrated cluster information for generating a second object detecting information; and an object extracting means receiving said sharpened image and said second object detecting information for extracting an object image from said sharpened image in accordance with said second object detecting information.

2. An object detecting system based on multiple-eye images, comprising:

a disparity detecting means receiving a plurality of images having different optical axes, for generating a reference image, a disparity information and a cluster information;

a mask generating means receiving said disparity information for generating a first object detecting information, said first object detecting information comprising information corresponding to a rough object extraction;

a region integrating means receiving said cluster information for generating an integrated cluster information based on information on an integrated cluster obtained by collecting a plurality of clusters having a substantially similar feature;

a region selecting means receiving said first object detecting information and said integrated cluster information for generating a second object detecting information; and an object extracting means receiving said reference image and said second object detecting information for extracting an object image from said reference image in accordance with said second object detecting information.

3. An object detecting system based on multiple-eye images, comprising:
- a first image sharpening means receiving a plurality of images having substantially the same first optical axis and different focus positions, for generating a first sharpened image, a focus information and a cluster information;
- a second image sharpening means receiving a plurality of images having substantially the same second optical axis different from said first optical axis and different focus positions, for generating a second sharpened image;
- a disparity detecting means receiving said first sharpened image and said second sharpened image having different optical axes, for generating a disparity information;
- a mask generating means receiving said focus information and said disparity information for generating a first object detecting information, said first object detecting information comprising information corresponding to a rough object extraction;
- a region integrating means receiving said cluster information for generating an integrated cluster information based on information on an integrated cluster obtained by collecting a plurality of clusters having a substantially similar feature;
- a region selecting means receiving said first object detecting information and said integrated cluster information for generating a second object detecting information; and
- an object extracting means receiving said first sharpened image and said second object detecting information for extracting an object image from said first sharpened image in accordance with said second object detecting information.

4. An object detecting system based on multiple-eye images, comprising:
- a first image sharpening means receiving a plurality of images having substantially the same first optical axis and different focus positions, for generating a first sharpened image and a focus information;
- a second image sharpening means receiving a plurality of images having substantially the same second optical axis different from said first optical axis and different focus positions, for generating a second sharpened image;
- a disparity detecting means receiving said first sharpened image and said second sharpened image having different optical axes, for generating a disparity information and a cluster information;
- a mask generating means receiving said focus information and said disparity information for generating a first object detecting information, said first object detecting information comprising information corresponding to a rough object extraction;
- a region integrating means receiving said cluster information for generating an integrated cluster information based on information on an integrated cluster obtained by collecting a plurality of clusters having a substantially similar feature;
- a region selecting means receiving said first object detecting information and said integrated cluster information for generating a second object detecting information; and
- an object extracting means receiving said first sharpened image and said second object detecting information for extracting an object image from said first sharpened image in accordance with said second object detecting information.

5. An object detecting system based on multiple-eye images for extracting an object image, comprising:
- an image sharpening unit configured to receive a plurality of images having substantially the same optical axis and different focus positions, and configured to generate a sharpened image, a focus information and a cluster information;
- a mask generating unit communicatively coupled to said image sharpening unit, said mask generating unit configured to receive said focus information, and configured to generate a first object detecting information, said first object detecting information comprising information corresponding to a rough object extraction;
- a region integrating unit communicatively coupled to said image sharpening unit, said region integrating unit configured to receive said cluster information, and configured to generate an integrated cluster information based on information on an integrated cluster obtained by collecting a plurality of clusters having a substantially similar feature;
- a region selecting unit communicatively coupled to said region integrating unit and said mask generating unit, said region selecting unit configured to receive said first object detecting information and said integrated cluster information, and configured to generate a second object detecting information; and
- an object extracting unit communicatively coupled to said image sharpening unit and said region selecting unit, said object extracting unit configured to receive said sharpened image and said second object detecting information, and configured to extract an object image from said sharpened image in accordance with said second object detecting information.

6. An object detecting system based on multiple-eye images, comprising:
- a disparity detecting unit configured to receive a plurality of images having different optical axes, and configured to generate a reference image, a disparity information, and a cluster information;
- a mask generating unit communicatively coupled to said disparity detecting unit, said mask generating unit configured to receive said disparity information, and configured to generate a first object detecting information, said first object detecting information comprising information corresponding to a rough object extraction;
- a region integrating unit communicatively coupled to said disparity detecting unit, said region integrating unit configured to receive said cluster information, and configured to generate an integrated cluster information based on information on an integrated cluster obtained by collecting a plurality of clusters having a substantially similar feature;
- a region selecting unit communicatively coupled to said mask generating unit and said region integrating unit, said region selecting unit configured to receive said first object detecting information and said integrated cluster information, and configured to generate a second object detecting information; and
- an object extracting unit communicatively coupled to said region selecting unit and said disparity detecting unit, said object extracting unit configured to receive said reference image and said second object detecting information, and configured to extract an object image from said reference image in accordance with said second object detecting information.

7. An object detecting system based on multiple-eye images, comprising:

a first image sharpening unit configured to receive a plurality of images having substantially the same first optical axis and different focus positions, for generating a first sharpened image, a focus information and a cluster information;

a second image sharpening unit configured to receive a plurality of images having substantially the same second optical axis different from said first optical axis and different focus positions, for generating a second sharpened image;

a disparity detecting unit communicatively coupled to said first image sharpening unit and said second image sharpening unit, said disparity detecting unit configured to receive said first sharpened image and said second sharpened image having different optical axes, for generating a disparity information;

a mask generating unit communicatively coupled to said disparity detecting unit and said first image sharpening unit, said mask generating unit configured to receive said focus information and said disparity information for generating a first object detecting information, said first object detecting information comprising information corresponding to a rough object extraction;

a region integrating unit communicatively coupled to said first image sharpening unit, said region integrating unit configured to receive said cluster information for generating an integrated cluster information based on information on an integrated cluster obtained by collecting a plurality of clusters having a substantially similar feature;

a region selecting unit communicatively coupled to said mask generating unit and said region integrating unit, said region selecting unit configured to receive said first object detecting information and said integrated cluster information for generating a second object detecting information; and an object extracting unit communicatively coupled to said first image sharpening unit and said region selecting unit, said object extracting unit configured to receive said first sharpened image and said second object detecting information for extracting an object image from said first sharpened image in accordance with said second object detecting information.

8. An object detecting system based on multiple-eye images, comprising:

a first image sharpening unit configured to receive a plurality of images having substantially the same first optical axis and different focus positions, for generating a first sharpened image and a focus information;

a second image sharpening unit configured to receive a plurality of images having substantially the same second optical axis different from said first optical axis and different focus positions, for generating a second sharpened image;

a disparity detecting unit communicatively coupled to said first image sharpening unit and said second image sharpening unit, said disparity detecting unit configured to receive said first sharpened image and said second sharpened image having different optical axes, for generating a disparity information and a cluster information;

a mask generating unit communicatively coupled to said first image sharpening unit and said disparity detecting unit, said mask generating unit configured to receive said focus information and said disparity information for generating a first object detecting information, said first object detecting information comprising information corresponding to a rough object extraction;

a region integrating unit communicatively coupled to said disparity detecting unit, said region integrating unit configured to receive said cluster information for generating an integrated cluster information based on information on an integrated cluster obtained by collecting a plurality of clusters having a substantially similar feature;

a region selecting unit communicatively coupled to said mask generating unit and said region integrating unit, said region selecting unit configured to receive said first object detecting information and said integrated cluster information for generating a second object detecting information; and an object extracting unit communicatively coupled to said first image sharpening unit and said region selecting unit, said object extracting unit configured to receive said first sharpened image and said second object detecting information for extracting an object image from said first sharpened image in accordance with said second object detecting information.

* * * * *